United States Patent [19]

Moore, Jr.

[11] 3,818,980

[45] June 25, 1974

[54] HEATRONIC VALVES

[76] Inventor: Robert David Moore, Jr., 817 W. Camino Rd., Arcadia, Calif. 91006

[22] Filed: June 11, 1971

[21] Appl. No.: 152,093

[52] U.S. Cl. .................................. 165/32, 165/105
[51] Int. Cl. .................................. F28d 15/00
[58] Field of Search .............................. 165/105, 32

[56] References Cited

UNITED STATES PATENTS

| | | | |
|---|---|---|---|
| 3,004,394 | 10/1961 | Fulton, Jr. et al. | 62/3 |
| 3,414,050 | 12/1968 | Anand | 165/105 X |
| 3,450,195 | 6/1969 | Schnacke | 165/105 X |
| 3,502,138 | 3/1970 | Shlosinger | 165/105 X |
| 3,517,730 | 6/1970 | Wyatt | 165/105 X |
| 3,525,670 | 8/1970 | Brown | 165/105 X |
| 3,543,839 | 12/1970 | Shlosinger | 165/105 X |
| 3,598,180 | 8/1971 | Moore, Jr. | 165/105 X |
| 3,613,773 | 10/1971 | Hall | 165/105 X |
| 3,621,906 | 11/1971 | Leffert | 165/105 X |

*Primary Examiner*—Albert W. Davis, Jr.
*Attorney, Agent, or Firm*—Christie, Parker & Hale

[57] ABSTRACT

Greatly improved heat valves, here termed heatronic valves, that are thermal analogs of NPN and PNP transistors are described individually and in analogs of electronic circuits. The heatronic valves comprise closed chambers including capillary material and a heat transfer fluid for conducting a large heat flow across a small temperature gradient in a first state and for resisting substantial heat flow across a substantial temperature gradient in a second state. They include multiply vented heat transfer surface structures at the heat input and heat output faces of the chamber which allow very high heat flux densities. Means are provided for changing between the first and second states in response to temperature or pressure inputs by adding or subtracting heat transfer fluid, or a second fluid, from the heat transfer portion of the chamber. The energy necessary for operating the heatronic valves is generally derived from the available temperature differential, thus requiring no external power sources. A thermal "capacitor" is also provided and circuits for diodes, constant temperature sources and several types of amplifiers are shown, as is a general technique for converting almost any electronic circuit to its thermal analog or heatronic circuit.

42 Claims, 31 Drawing Figures

INVENTOR.
ROBERT DAVID MOORE, JR.
BY
Christie, Parker & Hale
ATTORNEYS

HEATRONIC VALVES

BACKGROUND

In recent years so-called heat pipes have been developed for transferring large amounts of heat from a heat source to a heat sink with a low temperature gradient therebetween. The heat pipes have been capable of handling large quantities of heat with relatively small cross sections as compared with a good heat conductor such as a metal or the like for example. The heat pipe transfers heat by vaporization and subsequent condensation of a heat transfer fluid contained within the heat pipe. The term heat pipe is representative of a class of devices operating in the same manner rather than relating to the specific geometry of the devices. Heat transfer fluid is vaporized from a liquid state at the heat source portion of the heat pipe. The vapor so formed flows to the heat sink portion of the heat pipe which need be only at a slightly lower temperature in order to obtain a sufficient pressure gradient to effect large mass transfer and hence high heat flux. The vapor condenses in the heat sink region and is returned to the heat source region by a capillary material through which the liquid flows due to surface tension forces.

In a heat pipe both heat and fluid are flowing. The heat and vapor flow in one direction and the condensed liquid flows in the opposite direction, resulting in a large net heat transfer without appreciable net fluid transfer. The quantity of heat that can flow through the heat pipe is limited by the maximum flow rate of vapor or liquid that can be obtained between the heat source and heat sink portions of the heat pipe and the heat transfer capabilities of the surfaces at which vaporization and condensation occur. In short heat pipes the major limitations are heat transfer capabilities of the vaporizing and condensing surfaces.

In many situations it is desirable to control heat flux which may indirectly control or be controlled by temperature, thus, for example, it is important to control the heat flux and hence temperature in many nuclear reactors, isotope power supplies or the like. Conventional electronic circuitry for controlling temperature in these situations may be totally inadequate because, besides requiring external power, the high radiation flux will destroy or damage electronic components to the extent that they are no longer operable. Heat transfer by circulating fluid may not be desirable because of induced radioactivity and further the fluid must be pumped and controlled, both requiring external power sources, in order to obtain control of heat flux. It is also desirable to have the response time of the thermal control devices high so that rapid changes in conditions that vary the thermal load can be accommodated. In order to keep the response time, and also the total size and mass down, it is important to maintain a small size, and thus a small thermal mass, relative to the heat transfer capacity of the heat flux controls. In the past, however, such heat flux controls were large and massive with relatively low heat transfer capabilities and consequently large response times, so that they were impractical for many applications for which the present heatronic valves are fitted.

It is, therefore, desirable to provide heat valves or heat flux controlling devices of small size at high heat flux capability. Such heat valves should operate without moving parts, should operate in environments hostile to electronic controls or even fluid pumps should operate without requiring energy other than that provided by the temperature differentials already available and should interface readily with thermal, mechanical, and electrical inputs and outputs, and be readily adaptable to a wide variety of applications.

BRIEF SUMMARY OF THE INVENTION

Therefore, in practice of this invention according to a presently preferred embodiment there is provided a heatronic valve being a thermal analog of an electronic transistor comprising means including capillary material and a heat transfer fluid for conducting a large heat flow by vaporization and subsequent condensation in a first state and for resisting substantial heat flow in a second state, including a multiply vented heat transfer surface structure for high heat flux capability and means for changing between the first and second states in response to an external variable such as, for example, temperature.

DRAWINGS

These and other features and advantages of the invention will be appreciated as the same becomes better understood by reference to the following detailed descriptions of presently preferred embodiments when considered in connection with the accompanying drawings wherein.

Figure 3A:
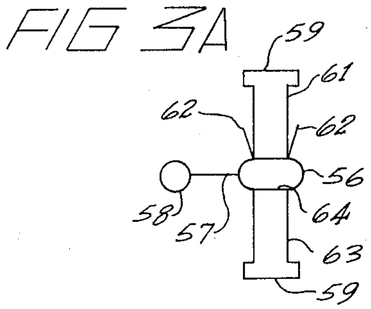
Figure 3B:
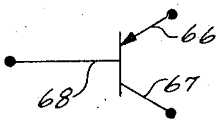
Figure 4A:
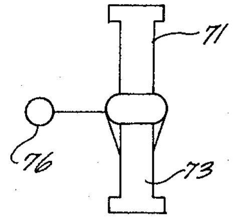
Figure 4B:
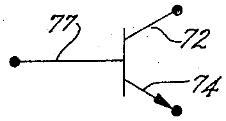
Figure 5A:
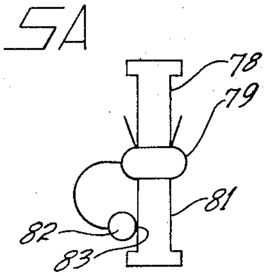
Figure 5B:
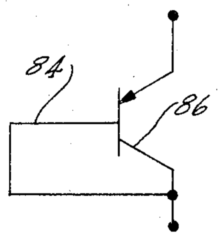
Figure 5C:
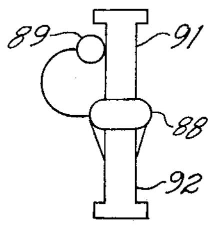
Figure 6:
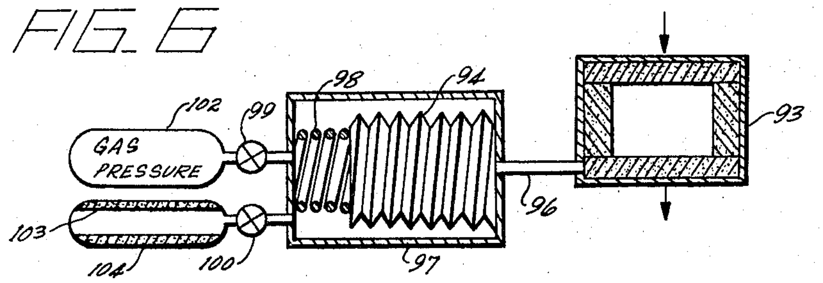
Figure 6A:
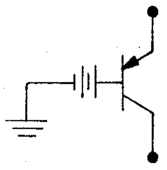
Figure 6B:
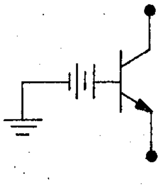
Figure 6C:
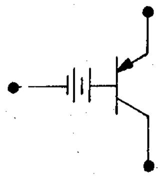
Figure 6D:
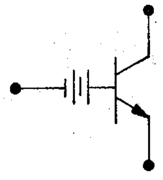
Figure 6E:
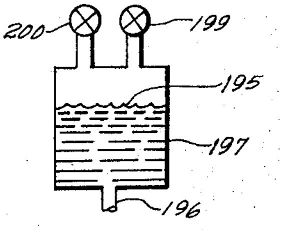
Figure 7:
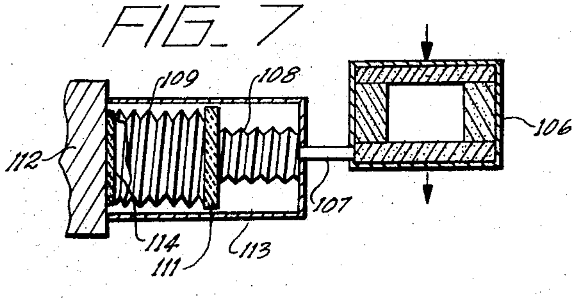
Figure 15:
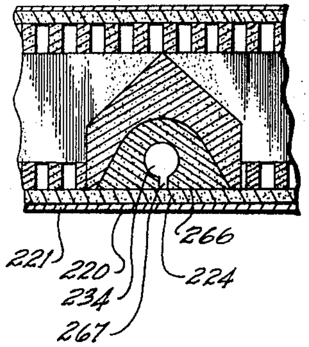
Figure 9A:
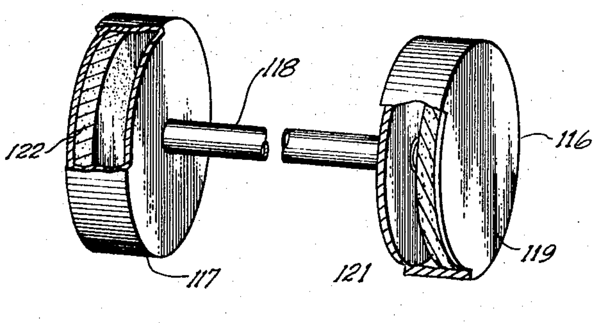
Figure 9B:
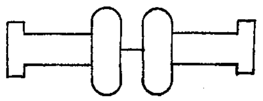
Figure 9C:
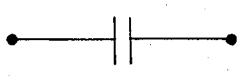
Figure 8:
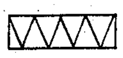
Figure 10A:
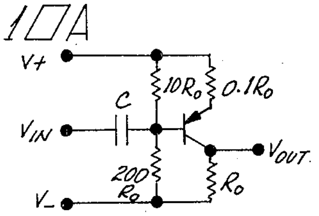
Figure 10B:
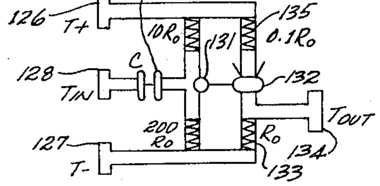
Figure 11A:
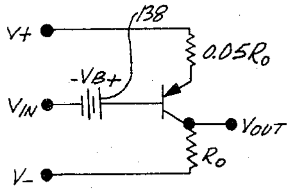
Figure 11B:
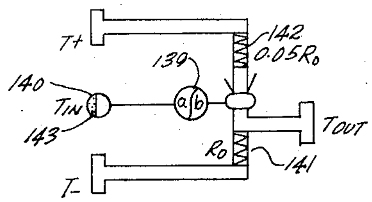
Figure 12A:
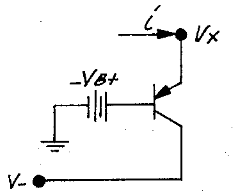
Figure 12B:
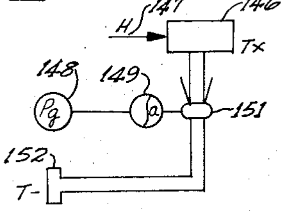
Figure 13A:
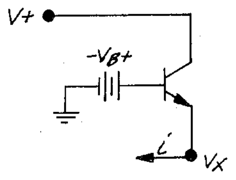
Figure 13B:
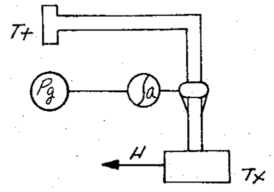
Figure 14A:
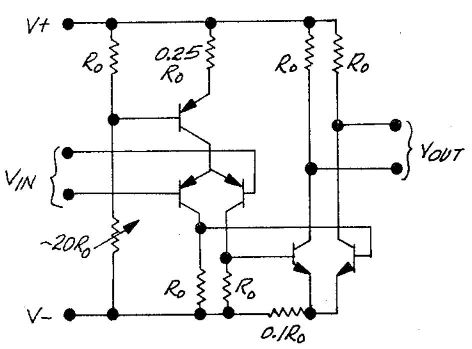
Figure 14B:
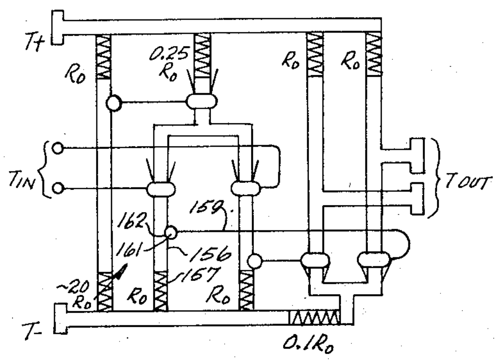

FIG. 3A introduces a schematic nomenclature analogous to electronic schematics for a heatronic valve acting as a PNP transistor and FIG. 3B illustrates the electronic equivalent of FIG. 3A;

FIG. 4A and 4B represent respectively schematic illustrations for a heatronic valve and its electrical analog wherein the heatronic valve operates as an NPN transistor;

FIGS. 5A, 5B, and 5C illustrate in schematic nomenclature a heatronic valve connected to operate as a heat diode and its electronic analog;

FIG. 6 illustrates schematically a heatronic valve including means for biasing operation of the valve;

FIGS. 6A to 6D are electronic analogs of a heatronic valve as illustrated in FIG. 6;

FIG. 6E is a modified reservoir for the heatronic valve of FIG. 6;

FIG. 7 illustrates schematically another means for biasing with gain operation of a heatronic valve;

FIG. 8 is a schematic representation of a thermal resistor;

FIG. 9A illustrates in transverse cross section a heatronic capacitor and FIGS. 9B and 9C illustrate the heatronic and electronic schematic representations thereof;

FIGS. 10A and 10B illustrate schematically electronic and heatronic analogs, respectively, of an A.C. amplifier;

FIGS. 11A and 11B illustrate schematically electronic and heatronic analogs, respectively, of a D.C. amplifier;

FIGS. 12A and 12B illustrate schematically electronic and heatronic analogs, respectively, of a potential controller;

FIGS. 13A and 13B illustrate schematically electronic and heatronic analogs, respectively, of another embodiment of potential controller;

FIGS. 14A and 14B illustrate schematically electronic and heatronic analogs, respectively, of a differential operational amplifier; and FIG. 15 illustrates in fragmentary cross section a portion of heatronic valve structure for gas control of heat flux.

DESCRIPTION

Figure 1:
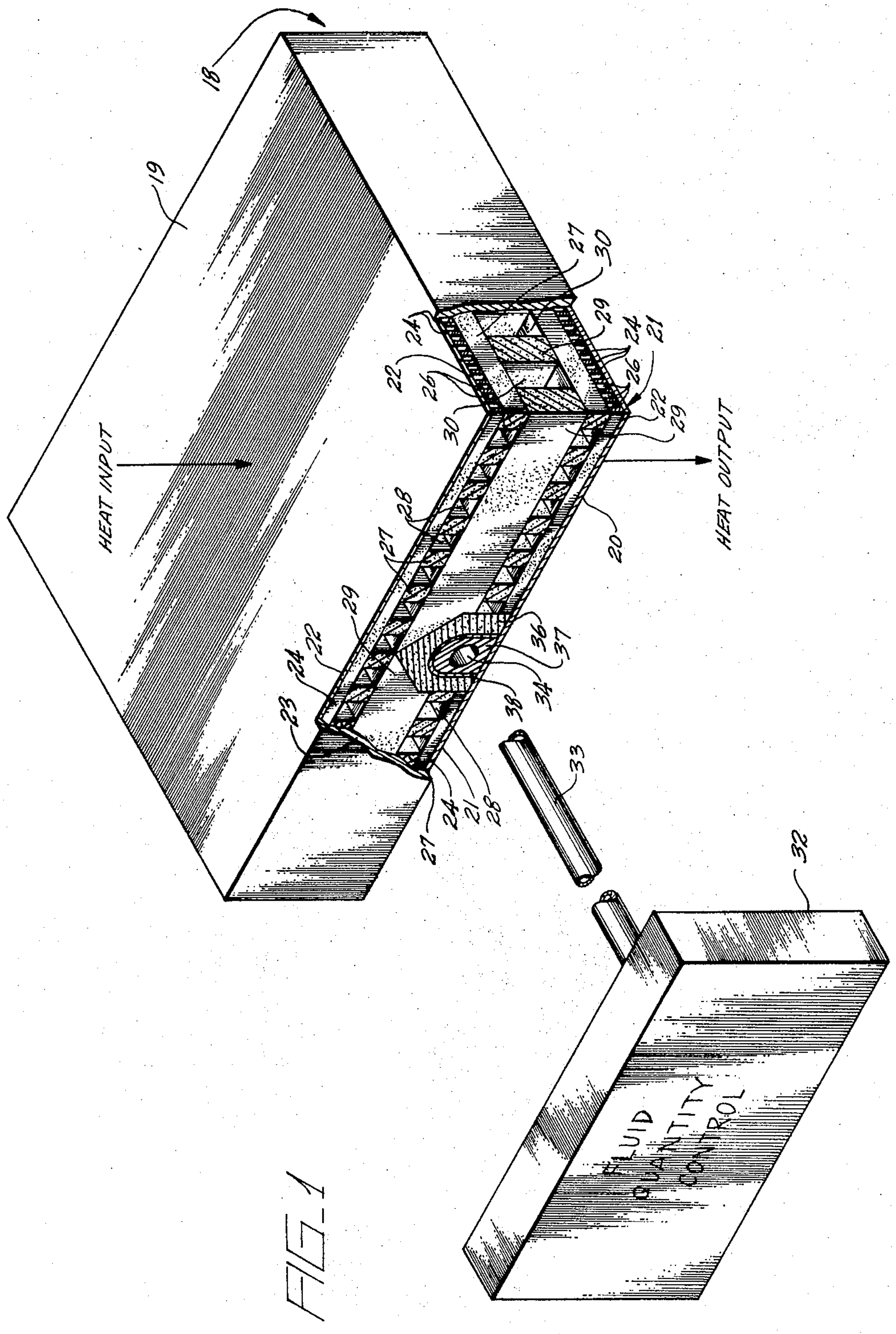
FIG. 1 illustrates in perspective cutaway and partly schematically a heatronic valve constructed according to principles of this invention.

FIG. 1 illustrates semi-schematically and in partial cutaway a heat transfer system incorporating a heatronic valve constructed according to principles of this invention.

The heatronic valve heat transfer portion 18 in the embodiment illustrated in FIG. 1 is a rectangular parallel pipe adapted to receive heat through the large heat input face 19 and reject heat through the opposing plane parallel heat output face 20. The heatronic valve is closed by an impervious metal envelope 21 which may be thicker on the outer faces than the faces through which heat enters and exits. In fact it may be desirable for optimum heat transfer to have the walls of any heat sources or sinks supplying heat to or receiving heat common with the envelope 21 from the heat transfer portion 11 for minimizing the thermal resistance between them. It should be recognized that the heatronic valve illustrated in FIG. 1 is of exaggerated size for purposes of clarity of illustration and that in actual practice such a heatronic valve might be about 0.8 inch square and 0.2 inch thick.

Within the envelope 21 there is provided in effect a very short, very high heat flux heat pipe having multiply vented heat transfer surface structures to provide the capability of handling extremely high heat fluxes when in an "ON" state and for resisting substantial heat flux when in an "OFF" state. The high heat flux surface structure is multiply vented for permitting vapor to closely approach phase change surfaces where vaporization or condensation, respectively, occurs. A variety of such multiply heat vented heat transfer surface structures are described and illustrated in the following copending patent applications and it is to be understood that any of the multiply vented heat transfer structures provided in these applications can be employed in practice of this invention even though but a single example of such a multiply vented high heat transfer structure is provided herein.

These copending patent applications are: U.S. Pat. application Ser. No. 52,609 entitled "Heat Transfer Surface Structure," now U.S. Pat. No. 3,598,180 U.S. Pat. application Ser. NO. 52,249 entitled "Segmented Heat Pipe", now U.S. Pat. No. 3,666,005 and U.S. Pat. application Ser. No. 52,642 entitled "The Heat Link, A Heat Transfer Device With Isolated Fluid Flow Paths," now U.S. Pat. No. 3,677,336 all filed Jul. 6, 1970 by Robert David Moore, Jr. They are hereby incorporated by reference for full force and effect as if set forth in full herein.

As well as the high heat flux surfaces these patent applications describe a variety of very high heat conductance devices which are capable of conducting the high heat flows utilizable by the heatronic valve over appreciable (greater than 20 feet in the case of the heat link) distances and delivering them to, or receiving them from, the heatronic valve at very high heat flux densities.

Immediately adjacent each of the faces 19 and 20 of the heatronic valve through which heat flows are a plurality of bars 24 of high thermal conductivity, high porous material, where $\delta$ is the effective matrix pore surface to volume ratio as defined in the aforementioned copending patent applications. Typically, the bars 24 would be made of very fine porosity, high thermal conductivity metal.

In between the bars 24 are vapor passages 26. In operation heat flows through the impervious wall or face 22 to or from the bars 24, the pores of which are filled with heat transfer liquid. Vaporization of the liquid occurs principally at the boundary between the porous bars 24 and the channels 26. Each channel 26 is considered to create a single regional area of phase change, namely vaporization on the side of the heatronic valve which receives heat and the condensation on the side of the valve that loses heat, even though said area may, as in this case, comprise separate strips of the surface regions of the two bars 24 on each side of the passage. The regional areas are also and further defined in my U.S. Pat. No. 3,598,180 which has been incorporated herein by reference. The regional areas of phase change are preferably spaced apart substantially less than about 0.1 inch in order to provide a high heat flux capability for the surface structure. The regional areas of vaporization, taken together, constitute a first phase change region while the regional areas of condensation, taken together, constitute a second phase change region. In other words the first, or vaporizing phase change region comprises the region in which the principal vaporization of the liquid takes place independent of how or whether it is divided while the second, or condensing, phase change region comprises in a similar manner the region in which the principal condensation of the vapor takes place.

Overlying the small bars 24 and extending transverse thereto are a plurality of larger, wider spaced bars 27 of porous material having an intermediate effective pore surface to volume ratio $\delta$ and a relatively low thermal conductivity as compared with the small bars 24 immediately adjacent the surface of the heatronic valve through which heat flows. The bars 27 are spaced apart to define vapor channels 28 lying across and in vapor communication with the smaller channels 26 between the surface bars 24.

In the middle portion of the heatronic valve and in contact with the bars 27 on both sides are a plurality of wicks 29 in the form of slabs of material having an intermediate effective pore surface to volume ratio $\delta$ and a relatively low thermal conductivity. The material forming the wicks 29 and the bars 27 may, for example, be a relatively coarser pored low thermal conductivity metal or glass. The several wicks 29 are spaced apart to leave vapor ways 30 therebetween running transverse to the vapor passages 28 between the bars 27. Thus it will be seen that there is vapor communication from the smallest channels 26 through the intermediate sized channels 28 to the larger vapor ways 30 and thence to the smaller vapor passages 28 nearer the opposite side of the heatronic valve and finally to the smallest passages 26 on that side of the valve. Similarly the various bars are in contact so there is liquid communication between the smallest bars 24 adjacent each surface by way of the intermediate bars 27 and the wicks 29.

During operation of the heatronic valve on its ON state heat flows into the heatronic valve through the heat input face 19 and vaporizes heat transfer fluid in the regional areas of vaporization between the smallest bars 24 and the small vapor passages 26 adjacent the surface. The vapor so formed passes through the intermediate sized passages 28 to the vapor ways 30 where it is transmitted to the intermediate size passages 28 on the heat sink surface side of the heatronic valve. The vapor then passes into the smallest channels 26 adjacent the heat losing surface of the heatronic valve and condenses in the regional areas of condensation on the smallest bars 24 in contact with the heat sink surface of the valve. The heat then flows through the envelope 21 and leaves the heatronic valve through the heat output face 20. The heat transfer liquid condensed into the small high δ, high thermal conductivity surface bars 24 is conveyed by capillary action through the porous bars 27 to the wicks 29 which in turn convey the liquid to the intermediate bars 27 and thence to the surface bars 24 at the hotter face of the heatronic valve.

Thus it will be seen that the heatronic valve operates as a tiny heat pipe on its ON state but is capable of handling extremely high heat fluxes because of the high efficiency of the multiply vented heat transfer surface structure at both the vaporization and condensation faces of the heatronic valve. The reason the high heat transfer surface structures are capable of handling extremely high heat fluxes is set forth in detail in the aforementioned copending patent application. Because of the multiply vented high heat transfer surface structures the heatronic valve can be made in a sufficiently small size to have a time constant suitable for practical applications. For a given ratio between the ON and OFF heat transfer rates the time constant of a heatronic valve is proportional to $[1/(H/A)^2_{max}]$ where H is the smaller of the maximum heat flow capacities of either the vaporizing or condensing surface structures, A is the area of the vaporizing or condensing heat transfer surface and $(H/A)_{max}$ is the maximum heat flux per unit area through the heatronic valve. Since the time constant is proportional to the inverse of the square of the maximum heat flux per unit area it becomes quite important to have a high heat transfer surface structure in order to achieve a very short time constant. It should also be noted that for a given ratio between the ON and OFF heat transfer rates the volume and hence the mass and weight of the heatronic valve is also proportional to the inverse of the square of the maximum heat flux capacity per unit area of the heat transfer surfaces and these are also minimized by having a multiply vented high heat transfer surface structure as described above. The reason that the volume of the heatronic valve is inversely proportional to the square of the maximum heat flux per unit area is that both the length (the distance between the heat input and heat output faces) and the area of the heatronic valve are proportional to $[1/(H/A)_{max}]$. The area is proportional to $[1/(H/A)_{max}]$ so as to obtain the required maximum heat flux with the heatronic valve ON while the length must be proportional to the area and thus to $[1/(H/A)_{max}]$ in order to keep the heat flux with the valve OFF as small as required. With a heatronic valve having a multiply vented heat transfer surface structure as hereinabove described a time constant in the order of about one seond or less can be obtained. The overall time constant of the heatronic valve approximately equals the maximum change in heat content of the valve upon change between the ON and OFF states divided by the heat transfer rate through the heatronic valve.

Additional structure is provided in the heat transfer portion of the heatronic valve chamber of the heatronic valve, that is, between the heat input face 19 and heat output face 20, in order to effect a change between its ON and OFF states. The heatronic valve chamber, or just chamber when otherwise unqualified, is defined as including the heat transfer portion of the heatronic valve chamber and all chambers and spaces in fluid communication with said heat transfer portion insofar as they are normally accessible to any fluid normally in the heat transfer portion. In order to effect such a change of state the quantity of heat transfer fluid in the heat transfer portion of the heatronic valve is changed as hereinafter described in greater detail. Briefly the high heat flux between the two faces of the heatronic valve can be stopped by increasing the quantity of fluid to the point that vapor passages are flooded with liquid thereby greatly increasing the thermal resistance of the heatronic valve. Another way of controlling the heat flux is to withdraw heat transfer fluid thereby starving the heat input face of heat transfer fluid. Control of the quantity of heat transfer fluid within the heat transfer portion of the heatronic valve is provided by a fluid quantity control 32 indicated only schematically in FIG. 1 and described and illustrated in greater detail hereinafter. The fluid quantity control 32 is in fluid communication with the heat transfer portion of the heatronic valve by a tube 33 or other conduit through which heat transfer fluid may flow. The tube is in fluid communication with the interior of a hollow passage 34 extending through a body of capillary material within the heatronic valve envelope. The passage 34 is typically a cylindrical cavity within a five-sided prism 36 of capillary material. The outer capillary material 36 forming the prism is preferably substantially identical to the capillary material forming the wicks 29 and since the prism runs the full width of the heat transfer portion of the heatronic valve each of the wicks 29 is in contact with the capillary prism 36 for free liquid transfer therebetween. Within the five-sided prism 36 and completely surrounding the passage 34 is an internal body of capillary material 37. This inner body of capillary material 37 preferably has a rather low effective capillary pore surface to volume ratio δ, that is, it has relatively large pores, and it is also a high thermal conductivity material such as a metal. There is preferably at least a thin layer of the inner body of capillary material between the passage 34 and the skin 22 of the heatronic valve since the capillary material thereby provides mechanical support for the extremely thin foil preferably used for the skin 22.

An optional structure illustrated in FIG. 1 is also provided in some embodiments in the form of a thin sheath 38 of capillary material between that of the prism 36 and the inner body 37. The porous material making up the sheath 38 preferably has a high capillary pore surface to volume ratio δ and a high thermal conductivity. Such a sheath having a high δ or small pore size is particularly useful in an embodiment where the capillary material within the heatronic valve is dried out by withdrawing heat transfer fluid from the envelope. The small pore size retains liquid thus preventing the passage of vapor and assuring that liquid is driven from the principal portion of the wicks 29 without vapor reaching the passage 34. If vapor were to reach the passage it would either limit the quantity of liquid withdrawn or deliver heat to the fluid quantity control when it condensed therein. In either case control of the heatronic valve would be sacrificed. The high δ, high thermal conductivity sheath 38 backed by the high thermal conductivity body 37 is on the cooler face of the heatronic valve and therefore remains relatively cooler than the wick as well as having a smaller pore size. This results in liquid first being driven from the wicks when the heatronic valve is dried out for resisting heat flow.

Figure 2:
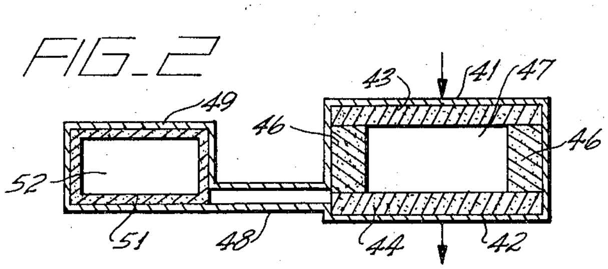
FIG. 2 illustrates schematically a heatronic valve of the type illustrated in FIG. 1.

FIG. 2 illustrates schematically a heatronic valve constructed according to principles of this invention. As illustrated herein the heatronic valve has a relatively warmer heat input face 41 and a relatively cooler heat output face 42. A multiply vented heat transfer surface structure 43 shown only schematically is provided on the warmer face 41 for high efficiency vaporization of heat transfer fluid. Similarly a multiply vented high heat transfer surface structure 44 is provided on the relatively cooler face 42 for high efficiency condensation of heat transfer fluid. A capillary wick 46 interconnects the surface structures 43 and 44 for conveying liquid therebetween and a vapor way 47 is provided between the surface structures for conveying vapor. A small diameter tube 48 communicates with passages in the capillary material of the wick 46 and/or cooler surface structure 44. The close analogy to the heatronic valve illustrated in FIG. 1 is apparent.

At the opposite end of the tube 48 from the heat transfer portion is a liquid reservoir portion 49 of the heatronic valve chamber. The walls of the reservoir are lined with a thin layer of a capillary material 51 which is preferably of relatively high thermal conductivity and with a relatively low effective capillary pore surface to volume ratio. This capillary material, while optional, helps assure that the fluid may be evaporated wherever it is in the reservoir, allowing liquid communication with the tube 48, either through capillary material as is shown, or directly. Normally the reservoir is made as small as feasible and may be flattened or otherwise shaped to allow heat to be transferred in and out readily. The lined reservoir has a central cavity 52.

Typically in order to transfer heat through the heatronic valve the temperature of the heat input face 41 is higher than the temperature of the heat output face 42 so that heat flows in the direction of the arrows. The temperature of the reservoir may be different from either of the two faces and may be independent of those temperatures or dependent upon one of them as will become more apparent hereinafter.

When approximately an optimum amount of heat transfer fluid is in the heat transfer portion of the heatronic valve, that is, the portion through which heat flows, it operates as a miniature heat pipe with vaporization and condensation occurring at the two faces and with both heat and fluid flowing at a very high rate. If it is assumed that there is an excess of heat transfer fluid in the heat transfer portion of the heatronic valve; that is, more than required to completely saturate the capillary material therein; then the excess liquid must be in vapor passages in the valve. The excess liquid accumulates in the cooler portion of the heat transfer portion of the heatronic valve since if it accumulated at any other point the vapor flow would drive it to the cooler portion. For this reason the effect of gravity upon the liquid can generally be ignored in operation of the heatronic valve. As a sufficient quantity of excess liquid accumulates in the vapor passages the multiply vented condensation surface rapidly loses efficiency. The reason for this is that the excess liquid first accumulates in the smallest vapor passages 26 (FIG. 1) immediately adjacent the cooler face of the heatronic valve. The accumulation of liquid prevents vapor from entering the small passages and by thus blocking the flow requires that any condensation occur further and further from the cooler face of the heatronic valve. As the heat given up by the condensation is more remote from the surface of the heatronic valve it must be conducted through the intervening liquid and capillary material before reaching the surface of the heatronic valve and the thermal resistance due to this may be two orders of magnitude or more greater than the thermal resistance of the high efficiency condensation surface in the absence of the excess liquid. A rather small amount of excess liquid, only sufficient to fill the smallest passages 26, and a portion of the somewhat larger passages 28 (FIG. 1) at the condensation surface can reduce the heat transfer capability of the heatronic valve by more than an order of magnitude, with a further order of magnitude reduction being achieved by completely filling the valve with liquid. It will be recognized, of course, that the heatronic valve is still capable of conducting some heat even when the excess liquid advances substantially the entire way to the higher temperature face of the valve solely because of the conduction through the capillary material and the liquid. This conduction is so very much less than the heat transfer by vaporization and condensation that very useful effects can be obtained by switching the heatronic valve between its ON and OFF states. It will also be recognized that the switching between the ON and OFF states is not a discontinuous function but is to some degree porportional to the quantity of excess liquid in the heat transfer portion of the heatronic valve or, conversely, to the amount heat transfer fluid vapor in the reservoir portion. It should be apparent, however, that the rate of change of heat transfer with additional liquid is extremely high as the smallest passages 26 are filled.

In order to obtain excess liquid in the heat transfer portion of the heatronic valve the tube 48 is typically filled with liquid and an excess of liquid is provided in the reservoir 49. When the temperature of the reservoir is raised above the temperature of the hotter face, which determines the vapor pressure in the vapor way 47 as long as the capillary material 43 contains liquid, which it always does in this version, vaporization occurs and the vapor accumulates in the cavity 52 of the reservoir since capillary forces maintain liquid in the tube and in the porous material 51, thus blocking the vapor from escaping the reservoir. The liquid in the cavity 52 is driven out through the tube 48 by increasing quantity of vapor therein so as to introduce an excess of heat transfer liquid in the heat transfer portion of the valve. On the other hand, if the temperature of the reservoir is less than the temperature of the hotter face, the vapor pressure within the heat transfer portion is sufficiently high to drive any excess liquid back through the tube 48 into the reservoir until the reservoir is full and a near optimum quantity of heat transfer liquid is left in the heat transfer portion. This amount thus left is initially set by the dimensions of the apparatus and quantity of fluid used.

FIG. 3A illustrates in a schematic nomenclature for heatronic valves a symbol for a valve as illustrated in FIG. 2. The heat transfer portion of the valve is symbolized by a pair of parallel lines closed at their ends by curves to form an oval or oblong 56. This is a symbolic analog of the interior of the heat transfer portion accessible to the heat transfer fluid comprising surface structures 43 and 44, wicks 46 and the vapor way 47. The tube 48 through which heat transfer fluid can flow is indicated in the symbolic nomenclature as a single line 57. The reservoir portion 49 is indicated in the symbolic nomenclature as a circle 58. Collectively these are also analagous to the "base" of a transistor. A pair of parallel lines closed at one end by a straight line and the opposite end by a symbolic terminal 59 represents an emitter 61 of heat as indicated by the "arrow" points or wings 62 which are analogous to the heat input face 41 and also to the emitter of a transistor. At the opposite face of the heat transfer portion 56 of the heatronic valve the symbolic nomenclature provides another pair of parallel lines closed by a straight line at one end and a terminal at the other end to represent a collector 63 of heat which are analogous to the heat output face 42 and also to the collector of a transistor. It will be noted that where a terminal 59 is provided heat may enter or leave the system. The terminal symbol, however, would not generally be shown when the heatronic valve is connected to other circuitry, analogous to the use of electrical and electronic symbols.

The analogy to a PNP transistor as illustrated in FIG. 3B should be apparent. In such an analog as illustrated in FIG. 3A heat flow is analogous to current and temperature analogous to voltage. A higher temperature on the emitter 61 causes heat to flow through the heatronic valve to the collector 63 so long as the temperature of the base or reservoir 58 is lower than the temperature of the emitter 61. If the temperature of the reservoir 58 is raised above that of the emitter 61 then the resulting vapor pressure of the liquid in the reservoir 58 is greater than the pressure in the heat transfer portion 56 so that vapor is formed in the reservoir portion 58 displacing liquid into the heat transfer portion 56 thereby blocking flow of heat therethrough. The very small relations hold true for current and voltage in relation to the emitter 66, collector 67 and base 68 of the transistor illustrated in FIG. 3B. The heatronic valve emitter 61 is analogous to the electronic emitter 66. The collector 63 is analogous to the collector 67 and the reservoir portion 58 and heat transfer portion 56 are analogous to the base 68 of the transistor. A potential on the base 68 that is more positive than the potential on the emitter 66 will limit current flow through the resistor. Similarly a higher temperature on the reservoir 58 than the temperature of the emitter 61 will block flow of heat through the heatronic valve 56.

Referring again to FIG. 2, the operation of the heatronic valve in a very nearly opposite manner to the operation described hereinabove, wherein the vapor passages are flooded with excess liquid for inhibiting or resisting heat flow, is described below. The total quantity of heat transfer fluid in the heatronic valve may be initially set so that the amount of fluid in the heat transfer portion of the chamber is near optimum for operation under maximum heat flux when the reservoir portion 49 is empty. This is the state for normal operation of this embodiment heatronic valve in its ON condition. If it is desired to switch the heatronic valve towards its OFF position the temperature of the reservoir 49 can be reduced below the temperature of the cooler face 42 so that vapor in the reservoir portion condenses and the resulting lowered pressure causes heat transfer liquid to flow from the heat transfer portion of the heatronic valve chamber into the cavity 52 in the reservoir. The depletion of liquid from the capillary material in the heat transfer portion tends to first dry up the wicks 46 which have a relatively larger pore size than the high efficiency heat transfer surfaces 43 and 44. As soon as sufficient liquid has been withdrawn and the liquid transport rate through the wicks 46 is greatly reduced, the small amount of liquid retained in the fine pores of the higher temperature surface structures 43 is rapidly vaporized. As soon as such drying has occurred the heat flux capability of the heatronic valve is sharply reduced and it is effectively in its OFF state. The only way for heat to be transferred from the warmer to the cooler faces of the heatronic valve is then by conduction through the capillary materials, radiation across the valve and conduction and convection in the vapor remaining in the vapor way 47. None of these are very effective heat transfer mechanisms under normal conditions, particularly since the capillary material forming the wicks 46 is preferably of low thermal conductivity. Once the liquid retained in the fine pores of the higher temperature, surface structure 43 has evaporated the vapor pressure in the heat transfer portion is set by the hottest liquid remaining, which, since it is in vapor communication with the cooler face 42, is about at the same temperature as the cooler face 42. Thus, the reservoir 49 must be cooler than the cooler face 42 in order to retain the liquid in the reservoir and the heatronic valve in the OFF state.

Although not specifically illustrated in FIG. 2 the heatronic valve preferably has a structure that permits liquid to flow through the tube 48 into the reservoir and effectively resist the intrusion of vapor. A structure such as illustrated in FIG. 1 is quite suitable for such purpose and in such an arrangement a tube for transferring liquid is connected to the passage 34 through the prism 36 of capillary material on the cooler face of the heatronic valve. It will be recalled that the inner body 37 of capillary material and sheath 38 both have high thermal conductivity and they are in thermal contact with the face 21 on the cooler side of the heatronic valve. As the vapor pressure in the reservoir portion of the heatronic valve drops below that of the cooler face 42, liquid is preferentially drawn from the relatively low δ wick material, all of which has a capillary path to the prism 36 nearer the center of the heatronic valve. The bars 27 and 24 have a relatively high δ and are therefore liquid filled after the lower δ wicks are dry. Similarly the sheath 38 has very fine pores and high thermal conductivity so as to stay relatively cool and filled with liquid as the wicks dry out. The liquid filled pores effectively block the flow of vapor and therefore only liquid can reach the passage 34 for flow to the reservoir.

As mentioned above, lowering of the temperature of the reservoir 49 in FIG. 2 below that of the cooler face 42 decreases the quantity of heat transfer fluid in the heat transfer portion of the heatronic valve and thereby turns it to its OFF state wherein little heat can flow as compared with its ON state. The analogy to an NPN transistor becomes apparent where the flow of current (heat) effectively turns off when the base voltage (temperature) is decreased below the emitter voltage (temperature). This can be seen in the symbolic nomenclature of FIG. 4A wherein the higher temperature heat source 71 is analogous to the collector 72 of an NPN transistor and the lower temperature heat sink 73 of the heatronic valve is analogous to the emitter 74 of the transistor illustrated in FIG. 4B. As before the heat transfer portion 75 and the reservoir 76 are analogous to the base 77 of the NPN transistor. The symbolic nomenclature employed in FIG. 4A is the same as that employed in FIG. 3A.

FIG. 5A illustrates a very simple heatronic circuit utilizing a heatronic valve which in effect provides a thermal diode wherein heat can flow from a warmer terminal 78 through the heatronic valve 79 to a relatively cooler terminal 81. Reverse heat transfer is however resisted if the normally cooler terminal device 81 is perchance warmer than the other heat terminal 78. This is accomplished by having the reservoir 82 of the heatronic valve with an excessive amount of liquid therein in thermal contact with the normally cooler terminal 81. This is indicated in FIG. 5A by the point or area of contact 83 between the terminal 81 and the reservoir 82. The electronic analog of such a connection is illustrated in FIG. 5B where the base 84 of the PNP transistor is connected to the collector 86. Forward current flow through the transistor is thereby possible and reverse flow is effectively blocked.

Forward heat flow through the heatronic diode illustrated in FIG. 5A occurs from the normally warmer heat terminal 78 to the normally cooler one 81. Such is the case since the liquid reservoir 82 is in thermal contact with the cooler heat terminal 81 and therefore any excess heat transfer fluid in the heatronic valve is in the reservoir leaving a near optimum amount of heat transfer fluid in the heat transfer portion of the heatronic valve. If on the other hand, the heat terminal 81 were warmer so that reverse heat flow might occur through the heatronic valve, the liquid containing reservoir 82 is also heated so that excess heat transfer fluid floods the vapor passages of the heatronic valve, thereby greatly reducing the heat transfer capability thereof. In summary, heat is transferred through the heatronic valve in one direction at a high heat flux because of the multiply vented heat transfer surface structures. Flow of heat in the opposite direction is effectively resisted by the heatronic valve, when connected as indicated in FIG. 5A, in the same manner as the transistor connected as in FIG. 5B resists current flow.

FIG. 5C also represents in the symbolic nomenclature a heatronic diode employing the heatronic analog of an NPN transistor. In this arrangement the heatronic valve 88 in its ON state has a near optimum quantity of heat transfer fluid in the heat transfer portion and its accompanying reservoir portion 89 is substantially dry. In its OFF state heat transfer fluid is transferred to the reservoir 89 so that the heat transfer portion is essentially dried up for resisting heat flow. In this arrangement this effect is obtained by having the reservoir 89 in thermal contact with the normally warmer heat terminal 91 from which heat flows through the heatronic valve 88 to the normally cooler heat terminal 92. Since the reservoir 89 is thus warmer, the heat transfer fluid is in its proper location in the heatronic valve for maximum heat flux capability. If on the other hand the normally cooler terminal 92 is warmer than the terminal 91 excess heat transfer liquid is transferred to the now cooler reservoir 89, drying up the heatronic valve and resisting heat flow in the reverse direction.

FIG. 6 illustrates schematically a heatronic valve constructed according to principles of this invention along with means for biasing the temperature at which it changes conductivity. As illustrated in this embodiment the heatronic valve has a heat transfer portion of the heat valve chamber 93 substantially identical to that illustrated schematically in FIG. 2. The heat transfer portion 93 is connected to a variable volume reservoir portion 94 of the chamber by a tube 96. The variable volume reservoir portion of the heat valve chamber 94 is conveniently a conventional metal bellows or the like. The bellows is sealed to one end of a fixed volume housing 97 and a spring 98 is provided between the end of the bellows and an end of the housing. The spring 98 may be one operating either in tension or compression for providing a spring bias on the bellows tending to bias it towards a larger or smaller pressure in the variable volume reservoir 94 as may be desired.

Either of two ways may be employed for additional biasing of the heatronic valve either individually or in combination. Therefore in the schematic illustration of FIG. 6 conventional fluid control valves 99 and 100 are illustrated so that the one figure may serve to illustrate either mode of operation.

In one arrangement a relatively large reservoir of gas 102 is connected by way of the valve 99 to the interior of the fixed volume housing 97 exterior to the bellows 94. The gas employed in the reservoir 102 is noncondensable at the temperatures involved so that within broad limits the temperature of the gas reservoir has little effect upon operation of the heatronic valve, though where very precise operation is desirable the reservoir may be put in a constant temperature region. It will be apparent that the gas pressure applied to the exterior of the bellows 94 operates in combination with the biasing effect of the spring 98 in pressurizing the fluid in the bellows 94.

Assume that the heatronic valve is of a type that operates in an ON condition with a near optimum quantity of heat transfer fluid in the heat transfer portion 93 and an excess quantity of liquid in the variable volume reservoir portion 94, that is, equivalent to a PNP transistor. The bias of the spring 98, say in compression in its illustrated position, would tend to force liquid from the reservoir into the heat transfer portion 93 so as to inhibit heat flow through the heatronic valve. Such inhibition would in fact occur when the temperature of the hotter surface of the heat transfer portion 93 decreased to the point that the vapor pressure of the heat transfer fluid at that temperature was insufficient to overcome the biasing pressure provided by the spring. When, on the other hand, the temperature of the hotter surface of the heat transfer portion 93 increased, any excess liquid would flow into the variable volume reservoir 94 against the bias of the spring and high heat flux capability would be reestablished. With such an arrangement the biasing effect of the spring 98 sets the temperature of the hotter surface of the heat transfer portion in the above example since if the temperature of the hotter surface rises above the set point the heatronic valve turns on and removes heat from the hotter surface while, if the hotter surface is colder than the set point, the heatronic valve turns off and allows the temperature of the hotter surface to rise. Similar operation is achieved when the heatronic valve is of the type that turns off when fluid is removed (NPN type) except that the temperature of the cooler surface is controlled. The spring is therefore an analog of a biasing voltage relative to ground on an electronic transistor, of the PNP and NPN types as shown in FIGS. 6A and 6B, corresponding to the "excess fluid" and "drying out" types of heatronic valves, respectively.

A very similar effect can be obtained by application of gas pressure from the reservoir 102 acting on the external face of the bellows 94. The bias that can be obtained from the gas pressure acts in the same way as the spring but may be more convenient in some embodiments since the pressure can be regulated from an external position quite remote from the reservoir whereas adjustment of the spring bias may not always readily be accomplished in an operating situation. Clearly the gas pressure can be used alone for biasing operation of the heatronic valve or it can be used in combination with a spring operating either externally of the bellows 94 or a spring within the bellows 94. The spring constant of the bellows itself will of course serve as some measure of bias on operation of the heatronic valve. It should also be noted that under some circumstances the surrounding housing 97 may be dispensed with since the effect of the external ambient pressure may be so small as to be ignored or may be used to bias the valve itself. The electronic circuit equivalents of heatronic valves biased by any of these means remain those shown in FIGS. 6A and 6B.

Another way of biasing the heatronic valve illustrated in FIG. 6 is by providing a condensable fluid in capillary material 103 in a small volume reservoir 104 connected to the housing 97 by the valve 100. The vapor pressure at a given temperature of the fluid in the reservoir 104 can be either higher or lower than the vapor pressure of the heat transfer fluid of the heatronic valve at that temperature and by suitable selection of the relative vapor pressures of the two fluids the heatronic valve may be biased so as to turn on at lower or higher input temperatures (i.e., the input temperature to the reservoir 104) than otherwise. Additional pressure increments on the fluid in the variable volume reservoir 94, such as those due to the spring 98 also contribute to the amount of bias. In operation the control reservoir 104 is at a temperature different from the temperature of the heatronic valve and with the fluid valve 100 open the vapor pressure of the control fluid in the reservoir 104 acts on the external face of the bellow 94. If the temperature of the biasing control reservoir 104 increases, the vapor pressure of the fluid therein increases, and the bellows 94 may be compressed thereby reducing the volume of the heatronic valve reservoir and changing the mode of operation of the heatronic valve from either an ON or OFF state to the opposite state, depending upon the type of heatronic valve employed. Similarly, when the temperature of the biasing control reservoir 104 decreases, the decreasing vapor pressure of control fluid in the housing 97 permits the bellows 94 to expand. It will be apparent that this provides for a control of the heatronic valve based on the temperature of a reservoir 104 that may be substantially different from the temperature of either the hot or cold sides of the heatronic valve heat transfer chamber itself. Just as one example, assuming a heatronic valve of the excess fluid type a capillary control reservoir 104 may hold a control fluid having a considerably higher vapor pressure than the fluid in the heatronic valve. The heatronic valve control point, i.e., the temperature at which it turns on and off, is then considerably cooler than the hotter surface of the heatronic valve rather than being at the same temperature. This allows direct coupling between heatronic valves of the same type without resistor biasing and is analogous to the use of a battery as a bias in a transistor circuit as shown in FIGS. 6C and 6D (battery voltage may be positive or negative). The battery analogy is particularly appropriate in the case of fluids with different vapor pressures. The battery "voltage" is then the difference in the temperature of the two fluids when they have the same vapor pressure with the "positive" terminal of the analogous battery being on the side of the higher temperature fluid. This temperature difference is only slightly temperature dependent, usually varying approximately with the absolute temperature and thus being essentially constant for most practical purposes, though over wide temperature swings the variation gives a small amount of amplification. The temperature difference due to spring loading, on the other hand, drops with increasing overall temperature and thus may be represented by a "battery" only over a narrow temperature range. FIGS. 6C and 6D differ from FIGS. 6A and 6B in that one side of the analogous battery is not grounded but remains as an input terminal analogous to the reservoir 104 which accepts a temperature input which, with the biasing "temperature" difference, controls the heat valve.

The structure of the reservoir 104 as shown in FIG. 7 is adequate for use where the vapor pressure of the fluid in it is greater than that of the fluid in the heat transfer chamber 93 and bellows 94 at the same temperature, since, in this case, the vapor issuing from the reservoir 104 and filling the space between the bellows 94 and the housing 97 will neither condense nor cause the liquid in the bellows 94 to vaporize. When the vapor pressure of the fluid in the reservoir 104 is lower than that in the bellows 94 when both are at the same temperature, however, the vapor from the reservoir 104 would condense on the bellows 94 and vaporize some of the liquid therein. This is prevented by making reservoir 104 similar to reservoir 49 as shown in FIG. 2, wherein the structure is such that bulk liquid rather than vapor issues from it. Thus, when the vapor pressure of the fluid used in reservoir 104 is lower than that used in the heat transfer chamber 93 or, equivalently, when the voltage of the equivalent batteries shown in FIGS. 6C or 6D must be negative, then the reservoir 49 shown in FIG. 2 should be substituted for reservoir 104.

There are many possible equivalents for the combination of the bellows 94 and housing 99, particularly when the spring 98 is not used. Foremost among these are designs similar to a typical hydraulic accumulator in which a chamber is divided into two chambers of variable volume by a flexible diaphragm and the even simpler case where no diaphragm is used at all and the fluid come into direct contact with each other but where mixing is prevented by gravity or acceleration forces, or by barriers of capillary material which are selectively wet by one of the fluids and thus only allow passage of that fluid. Thus, for example, FIG. 6E shows an alternate structure for the portion of the device depicted in FIG. 6 wherein the housing 197 is turned so that the conduit 196, analogous to conduit 96, emerges from the bottom and gravity is used to keep the heat transfer fluid used in chamber 93 separate from the other fluids with only a direct fluid to fluid interface 195 between them.

FIG. 7 illustrates schematically a heatronic valve having another means for obtaining biasing of the valve. As illustrated in this arrangement, the heatronic valve has a heat transfer portion of the heatronic valve chamber 106 substantially similar to that hereinabove described and illustrated in FIG. 2. The heat transfer portion is connected by a tube 107 to a variable volume reservoir portion of the heatronic valve chamber 108 comprising a conventional bellows or the like. A second bellows 109 has one end in contact with a rigid thermally insulating pad 111 which is against the end of the bellows 108 forming the reservoir of the heatronic valve. The other end of the bellows 109 is in thermal contact with a heat conductor 112 the temperature of which serves to control the operation of the heatronic valve. The term heat conductor, as used herein, refers to any transmitter of heat, such as a metal or other heat conductive substance, a heat pipe, a heat link, a convective heat transport system, or it may be simply the boundary of a heat source. If desired, in order to minimize the effect of atmospheric pressure a sealed and evacuated housing 113 may be provided around the bellows 108 and 109. Within the control bellows 109 and in thermal contact with the heat conductor 112 is a body of capillary material 114 containing a vaporizable liquid (not shown).

In operation the control fluid in the capillary material 114 acts on the heatronic valve in substantially the same manner as the control fluid in the reservoir 104 hereinabove described and illustrated in FIG. 6. Thus as the temperature of the heat conductor 112 increases, the vapor pressure within the bellows 109 increases tending to increase the pressure within the bellows 108 of the heatronic valve. The insulating pad 111 is provided between the two bellows for minimizing heat transfer between the fluids within each of them. A difference from the embodiment hereinabove described arises from the bellows 109 which has a cross sectional area larger than the cross sectional area of the bellows 108 forming the reservoir for the heat transfer fluid at the heatronic valve. Since the cross sectional area of the control bellows 109 is greater than the area of the reservoir bellows 108 the effect of pressure in the control bellows is increased and a smaller change in pressure is required to affect operation of the heatronic valve than would be required if the effective area on which the pressure was acting were the same as the cross section of the reservoir bellows 108. This means that a lower temperature of the heat conductor 112 is required in order to obtain a sufficient pressure in the control bellows 109 to change operation of the heatronic valve. Thus it is seen that biasing is also provided in the control arrangement for the heatronic valve illustrated in FIG. 7. Once again it turns out that a battery is a close analog with only a small variation in temperature difference approximately proportional to the absolute temperature as before. The polarity of the battery may be reversed by forming a control bellows smaller than the reservoir bellows so that the effective area on which the pressure acts is smaller. The appropriate electronic circuit analogs are those already shown in FIGS. 6C and 6D. The vapor pressure of the control fluid in the control bellows 109 can be higher, lower, or the same as the vapor pressure of the heat transfer fluid in the heatronic valve in order to provide any desired biasing effect over a selected temperature range. The biasing arrangement can further be combined with a spring biasing or gas pressure biasing as provided in FIG. 6.

Although not specifically illustrated herein, it will be apparent that the arrangement provided in FIG. 7 also affords one the opportunity of providing logic gates formed of heatronic valves. Thus, for example, in order to provide an OR gate a number of "input" bellows can be provided any one of which may be sufficient for operating the reservoir bellows. Similarly, an AND gate is readily formed wherein a plurality of "input" bellows are connected to the reservoir bellows in such a way that action of all of the input bellows could be required to obtain a sufficient effect on the reservoir bellows to change the mode of operation of the heatronic valve.

Other biasing and gain providing arrangements can readily be devised by one skilled in the art including, for example, many different well known types of mechanical and hydraulic couplings, reservoirs, accumulators, and the like, and also various types of mechanical, electrical, and hydraulic input and output devices. Thus, as regards input devices, the bellows 94 in FIG. 6 may be driven by fluid pressure in the housing 97, said fluid pressure being derived from whatever source desired. If it is desirable to use an electrical input the spring 98 may be replaced with a solenoid or other electromechanical transducer or the reservoir 104 may be heated directly by means of an electrical resistance element. Mechanical inputs may be applied directly to the bellows 94. Output devices are equally simple since the heatronic valve may be used to control the temperature of a reservoir containing a vaporizable liquid and its vapor with the resulting fluid pressure being used as desired or converted into mechanical effects by various well known means. Likewise temperature differences controlled by the heat valve may be used to operate various types of heat engines or even thermal/electrical transducers such as thermo-electric plasma diodes or thermo-electric power sources.

The embodiments of the heat transfer portion of the heatronic valve may vary considerably from those shown in the preceding Figures but may be divided roughly into two classes:

1. Those which are similar to conventional heat pipes and to the embodiment shown in FIG. 1 in that the liquid returning from the condensing region to the vaporizing region does so mainly through capillary material which effectively links the two regions.

2. Those which are similar to the heat link as described in the aforementioned U.S. Pat. application; "The Heat Link, a Heat Transfer Device with Isolated Fluid Flow Paths," and incorporated by references herein, in which the distance through which the liquid must flow through capillary material is greatly reduced by conveying the liquid a considerable portion of the way from where it is condensed to where it is vaporized through a passage large with respect to the capillary material.

Both embodiments have their good features and corresponding drawbacks. The heat link can transport very large heat flows over long distances but the returning liquid must be kept somewhat cooler than the vaporizer temperature to prevent vapor blocks from forming and stopping operation. Standard heat pipes are not subject to vapor blocks but are quite limited in the distance they can convey appreciable heat fluxes. This does not usually impair their usefulness in heatronic valves, however, since the distance between the hot and cold faces thereof can usually be held quite small, i.e., on the order of a quarter of an inch or less. On the other hand, the use of a heat link as the heat transfer portion of the heatronic valve is particularly convenient where it is necessary to control a heat flux which must be transported through a considerable distance.

Control of both embodiments is accomplished in the same manner by varying the amount of heat transfer fluid, or of a second fluid, in the heat transfer portion of the heatronic valve chamber and both utilize the vented capillary heat transfer surface structures as described herein and in the aforementioned patent applications. A simple version of a heat link wherein the thermal conductance is varied by varying the amount of heat transfer fluid in the heat transfer portion is shown in FIG. 2 of the aforementioned U.S. Pat. application "The Heat Link, a Heat Transfer Device with Isolated Fluid Flow Paths." The reservoir shown therein has a flexible diaphragm separating the heat transfer fluid from a separate vaporizable fluid which pressurizes the reservoir and thus operates in the same manner as the combination of the bellows reservoir 94, housing 97 and reservoir 104 shown herein in varying the thermal conductance of the heat transfer device. Other means for varying the quantity of fluid in the heat transfer portion of the heatronic valve as shown here, such as the liquid reservoir 49 in FIG. 2 or the gas reservoir 102 with the associated housing 97 and bellows reservoir can be attached to aforementioned heat link in the same manner. FIG. 16 of the aforementioned heat link patent application shows one embodiment of the heat link utilizing a second fluid, either a non-condensable gas or a vaporizable liquid, for both pressurizing the heat transfer fluid in the heat link and varying the thermal conductance of the heat link.

There are considerable advantages in spacing the second, or condensing, phase change region equidistant from the first, or vaporizing phase change region since the entire vaporizing region will then operate at a uniform heat flux density and the condensing region likewise so that the optimum surface structure in these regions will be uniform. Likewise the capillary material and the passages in between will then carry uniform liquid and vapor flows per unit area. In the embodiment shown in FIG. 1 this was accomplished by making the two phase change regions lie substantially on parallel plans. The large number of regional areas shown in FIG. 1 are each actually perpendicular to the phase change planes but, taken together, define two relatively thin flat phase change regions which are parallel to each other. In another embodiment, which is not illustrated herein, the phase change regions are also equidistant over their extent but lie substantially on cylinders that are co-axial with each other. This embodiment has the advantage that the two phase change surfaces do not have to be of equal area. Typically, the vaporizing phase change region would lie on the inside cylinder, thus allowing the condensing phase change region on the outer cylinder to have a substantially greater area.

Usually, when the heat transfer portion is similar to a heat pipe, the vaporizing and condensing phase change regions are at least approximately equidistantly separated from each other and are connected by capillary material so that liquid is returned through the capillary material substantially the entire direct distance (i.e., the separation distance) therebetween even though, for example, in some instances the returning liquid may flow parallel to the condensing surface before entering the capillary material to return to the vaporizer. Typically, the returning liquid is conveyed entirely through capillary material from where it condenses, such as in the regional areas of condensation in a vented capillary condensing surface structure to where it vaporizes, such as in the regional areas of vaporization in a vented capillary vaporizing surface structure, though obviously these are not necessarily both vented surface structures.

As mentioned briefly hereinabove, the heatronic valves can be combined in circuits analogous to electronic circuits and for that purpose something in addition to the active analogs of transistors may be required. It should be immediately apparent that the thermal analog of an electronic resistor is nothing more than a thermal resistance such as, for example, a layer of thermal insulation. At very high heat fluxes even a thin layer of a good heat conducting substance contributes appreciable thermal resistance. In providing heatronic circuits it is desirable to have symbolic nomenclature for the various elements and therefore FIG. 8 illustrates a symbol representative of a thermal resistance. This symbol is consistent with those hereinabove presented in providing an elongated rectangle or bar indicating that heat can be transferred along the length of the symbol. The zigzag line extending the length of this symbol is exactly analogous to the symbol most commonly used for an electronic resistor. The corresponding symbol for a heat conductor is similar, being a double line or bar. In a non-connecting cross-over of two conductors the double lines are left crossing each other while, in a thermal connection between conductors, the four short line segments crossing the intersection are removed. Thermal connections between conductors and other elements, such as resistors, capacitors, valves, reservoirs, etc. are all made by simply running the parallel lines or bars directly up to the other element or along side it so as to be in contact with it. A pressure or fluid conductor, such as that between a reservoir and a heat transfer portion of a heatronic valve, in which the conduction of heat is negligible or incidental to its operation, is represented by a single line. Heat conductors and pressure conductors cannot make connections to each other without an intervening element such as a reservoir or heatronic valve.

A satisfactory simple heatronic inductor has not as yet been devised, however, this is of little consequence since the effect of inductance can as readily be simulated in a heatronic circuit with heat valves, resistors, and capacitors as in an electronic circuit with active elements such as transistors as well as resistors and capacitors, as is well known in the electronic art.

FIG. 9A illustrates schematically a heatronic capacitor for providing capacitance in substantially the same manner capacitance is provided in an electronic circuit. The heatronic capacitor comprises a closed chamber, a portion of the envelope of which is cut away in FIG. 9A in order to reveal the internal structure. A capacitance fluid composed of a heat transfer material and a second material which, together with the heat transfer material, forms a homogenous liquid, but which is not appreciably vaporized at the temperatures involved is distributed within the envelope as subsequently described. The capacitance chamber is symmetrical having two disc-like chambers 116 and 117 thermally isolated from each other but interconnected by a tube 118. Thermal insulation (not shown) may be placed between and around the disks and tube to further reduce heat leakage. A face 119 of the chamber 116 is adapted to receive a discharge heat during operation of the capacitor. A similar face (hidden in FIG. 9A) is provided on the other chamber 117 for receiving or discharging heat. The tube 118 is typically only a very short element, no greater than the radius of the disk-like chambers 116 and 117. However, the length of the tube 118 may be extended to form a conductor of considerable length without appreciably affecting the performance of the device as long as it is kept sufficiently hot that liquid does not condense within it. It will also be apparent that the chambers 116 and 117 need not be circular. They can have other geometries as may be convenient in a particular application.

Within the chamber 116 and in thermal contact with the face 119 adapted to receive or discharge heat is a capillary material 121 which is preferably multiply vented with channels or large pores (not shown) that are sufficiently larger than the majority of pores that they distribute vapor throughout the the capillary material so that the vapor and liquid are in intimate contact throughout the capillary material. The amount of fluid contained in the chambers is limited so that the channels or larger pores are never completely liquid filled. The quantity of capillary material 121 that is provided in the chamber 116 is selected to provide a fine capillary pore volume appropriate for the desired thermal capacitance. The larger the pore volume available to hold liquid the larger the capacitance of the heatronic capacitor.

Within the other chamber 117 is another body of capillary material 122 substantially identical to the body of capillary material 121 in the first chamber. The quantity of capillary pore space in the two chambers is typically identical. The series thermal resistance of the capacitor is largely the thermal resistance of the capillary materials 121 and 122 through which heat must pass. Therefore to decrease the resistance of the heatronic capacitor it is preferred to enlarge the area across the faces through which heat is transferred and make the thickness of the bodies of capillary material as small as feasible. For large capacitors various techniques of pleating, folding, rolling, or the like may be used to reduce the size and thermal mass of the structure. Also, it is desirable to make the capillary material as good a heat conductor as feasible. Thus copper or another high heat conductivity metal or some high heat conductivity ceramic such as beryllium oxide might be used.

An electronic capacitor in effect always has the same net charge (usually approximately zero) within it and it is only the charge distribution between the two sides of the capacitor that varies with potential difference across it. A similar function is provided in the heatronic capacitor wherein the quantity of heat contained within the heatronic capacitor is approximately constant and only its distribution from one side thereof to the other is varied with potential difference across it. In other words, when a capacitor is "charged" the charge flows through the capacitor. Also, when an electronic capacitor is charged the voltage increases proportionately to the total charge passing through the capacitor. To achieve the analogous effect in the heatronic capacitor, each of the bodies 121 and 122 of capillary material in the heatronic capacitor are equally partially filled with a quantity of capacitance fluid in an amount less than required to fill all of the capillary pore volume of the respective body. The capacitance fluid is not a pure liquid but is instead in the form of a vaporizable heat transfer material containing a substantially non-vaporizable solute with a relatively broad solubility range. A broad variety of materials are suitable for forming the capacitance fluid and, as just one example, a solution of lithium bromide in water may be used.

The vapor pressure of a solution comprising a vaporizable material and a substantially non-vaporizable solute is approximately proportional to the concentration of vaporizable material in the solution. This is in accordance with Raoult's Law. Similarly, the temperature difference between two solutions having different concentrations of vaporizable material, that is necessary to maintain equal vapor pressures over both solutions, is approximately proportional to the difference in the vaporizable material concentration, with the solution having the higher vaporizable material concentration having the lower temperature.

Since the two chambers 116 and 117 are connected, the vapor pressure is the same in both, and since each of the bodies receives an equal charge of a capacitance liquid, both contain the same amount of solute. The amount of vaporizable material in each chamber varies, however, as the temperature differential between them varies, or equivalently the temperature differential varies as the vaporizable material evaporates from one chamber and condenses in the other. As one example, assume that heat enters the chamber 117 of the thermal capacitor and evaporates heat transfer material therefrom. The resulting vapor passes through the tube 118, carrying with it the heat of vaporization which is delivered to the capillary material 121 of the chamber 116 from which it flows through the chamber wall out of the capacitor. Thus, heat passing through the capacitor transfers vaporizable heat transfer material from chamber 117 to chamber 116, thus decreasing the concentration of the vaporizable heat transfer material in chamber 117 and increasing the concentration in the other chamber 116.

To accomplish this transfer, or maintain it once established, requires that the chamber 117 be hotter than the chamber 116 by the temperature differential mentioned above, which is approximately proportional to the difference in concentration of the vaporizable heat transfer material in the two chambers. The temperature differential is thus approximately proportional to the amount of heat transfer material transferred between the chambers and thus to the amount of heat transferred. The thermal capacitor is thus a good analog of an electrical capacitor with the usually unimportant difference that it is difficult to make the thermal capacitor as linear as a typical electrical capacitor. This lack of linearity, however, does not prevent thermal capacitors from being used in most typical applications, such as, filtering capacitors or blocking capacitors.

The overall thermal capacitance $C_o$ of the heatronic capacitor is exactly equal to $\Delta Q/\Delta T$, where $\Delta Q$ is the total heat transferred across the capacitor, and $\Delta T$ is the temperature differential. An approximate derivation utilizaing Raoult's Law and the Clapeyron-Clausius Equation gives $$C_0=\frac{\Delta Q}{\Delta T}=\frac{NL_e^2\left[1+\frac{1}{X}\left(1-\left(\frac{\Delta N}{N}\right)^2\right)\right]}{2RT^2} \quad (1)$$

which is approximately equal to $$\frac{NL_e^2\left(1+\frac{1}{X}\right)}{2RT^2} \quad (2)$$

when $\Delta N/N$ is very much less than 1; where $N$ is the number of gram moles of vaporizable heat transfer material originally in one chamber of the capacitor; $\Delta N$ is the decrease in heat transfer material in the chamber initially receiving the heat; $L_e$ is the heat of vaporization of one gram mole of heat transfer material; $R$ is the gas constant; $T$ is the mean of the absolute temperatures of the two sides of the capacitor; and $X$ is the total mole fraction of solute (molecules or ions) initially in the capacitance solution; likewise, the temperature differential $\Delta T$ across the thermal capacitance is $$\Delta T=\frac{2RT^2\left(\frac{\Delta N}{N}\right)}{L_e\left[1+\frac{1}{X}\left(1-\left(\frac{\Delta N}{N}\right)^2\right)\right]} \quad (3)$$

and the heat transferred $\Delta Q$ is $$\Delta Q = L_e\Delta N = L_e(\Delta N/N)N \quad (4)$$

It is generally not good practice to evaporate all of the heat transfer material from either chamber since the capacitor becomes quite nonlinear as the $\Delta N/N$ term approaches 1, and also if the solute is a solid, the solute will crystallize out of the solution and have to be redissolved in order to "discharge" the capacitor. Usually this would be accompanied with considerable hysteresis which appears as a large series resistance. In a typical embodiment, about one-half of the heat transfer material is evaporated from one chamber to the other at the maximum state of charge. Thus, a capacitor which initially has two parts of vaporizable heat transfer material in each chamber when uncharged would have one part of heat transfer material in one chamber and three parts of heat transfer material in the other chamber when at maximum design charge. In order to obtain greater linearity, that is, wherein $\Delta T$ is more closely proportional to $\Delta Q$, the capacitor may be designed to transfer a smaller proportion of the heat transfer material between the chambers.

The design parameters for a selected capacitor are obtained by first setting $\Delta N/N$ either to about one-half or less if necessary to achieve greater linearity, then solving Equation (3) for $X$, and inserting the temperature difference $\Delta T$ required. The mole fraction of solute $X$ vs. temperature differential $\Delta T$ may be obtained more accurately directly from data relating vapor pressure to concentration and temperature for the solution of vaporizable heat transfer material and solute. In any case, the solubility limits of the solute should not be exceeded so that the liquid in the capillary bodies remains as a single phase. The number of gram moles of heat transfer material required is obtained by solving Equation (4) for $N$, having inserted the desired maximum value of heat $\Delta Q$ transferred to charge the capacitor ($\Delta Q = C_o\Delta T$).

The porous material 122 in the capacitor is vented with vapor passages (not shown) both to increase the heat transfer capability of the surface and, of more importance, to insure that evaporation or condensation of the heat transfer material takes place uniformly throughout the porous material so as to avoid appreciable differences in solute concentration within the body. Such concentration differences result in long diffusion time constants and hysteresis, which appears as a series resistance in the capacitor. Venting in this case where the vapor flow rates are relatively low may be achieved by utilizing a porous material having an appreciable range of pore sizes and sufficient pore volume for a portion of the pores to remain vapor filled under all normal operating conditions. If desired, a vented capillary surface structure as described hereinabove in relation to FIG. 1 may be employed.

A solute may comprise a single or several different substances which may be liquid or solid at the operating temperatures and which have a very low vapor pressure at the operating temperature. The vaporizable heat transfer material may also comprise one or more substances. The only distinction between the heat transfer material and the solute as used herein, being that the heat transfer material has a considerably higher vapor pressure than the solute at the operating temperatures. In some circumstances, the vaporizable heat transfer material might by itself be a solid, which in mixture with the solute forms a liquid solution.

Although a solution of lithium bromide in water is well suited for a capacitance liquid, many other combinations of vaporizable heat transfer material and solute will be apparent to one skilled in the art.

The heat capacity or thermal mass of a material actually acts as a type of thermal capacitance for which the electrical analog is a capacitor with one lead permanently grounded. Even though such capacitances are useful in some filtering applications, thermal masses are not suitable as true two terminal capacitors, such as a blocking capacitor between two stages of an amplifier, where it is necessary to let alternating signals pass while blocking direct potentials (thermal potentials or temperature differences in this case). Most typical heat conductors and heat transfer devices, including heatronic valves and thermal capacitors, have appreciable thermal masses analogous to stray capacitances to ground, which should be explicitly considered in heatronic designs. The usual result of the stray capacitances is an increase in various time constants. Generally, it is best to keep the thermal mass of the various system elements to a minimum, the thermal resistances low, and the heat flow rates high to reduce these time constants as much as possible. The extremely high heat flow capacity to thermal mass ratio of the heatronic valve herein described is very useful in this respect. Heat conductors should be kept as short as possible, with heat pipes having high heat flux heat transfer surfaces as described in copending U.S. Pat. application Ser. Nos. 52,609 and 52,249 used as heat conductors, even for very short distances, and heat links as described in copending U.S. Pat. application Ser. No. 52,642 being used for longer distances.

FIG. 9B illustrates a symbolic nomenclature for a heatronic capacitor as described and illustrated in FIG. 9A. The analogy of this to the symbol for an electronic capacitor as illustrated in FIG. 9C is apparent.

The various "heatronic" circuit elements presented herein, that is, thermal resistors, thermal capacitors, and heatronic valves corresponding to PNP and NPN transistors allow practically any electronic circuit to be directly converted to its electronic analog. The various time constants involved in the operation of the thermal capacitor and the heatronic valves are considerably larger than those for electronic elements and typically run about 1 second. This is considerably faster, however, than was possible for the prior art heat pipe type thermal valves where time constants typically ran around a minute or more and which also were much larger and more massive.

The heatronic valves presented herein are also particularly easy to utilize in circuits. This is due to their having simple and easily characterized control characteristics almost exactly equivalent to the well known PNP (for the excess fluid type) and NPN (for the drying out version) transistors. Their actual use is often simpler than that of the equivalent transistors since the heatronic valve heat flow gain, equivalent to the current gain in a transistor, can be made extremely large by relatively simple thermal isolation of the control reservoir or reservoirs. Also, the simplicity and permanence of the various direct biasing techniques makes the heatronic valves very attractive for use in heatronic circuits as compared with the use of batteries, which must be recharged or replaced periodically, in electronic circuits.

Given the thermal capacitor and resistor and the heatronic valves herein described, almost all simple circuitry comprising them is directly analogous to already known electrical or electronic circuitry. Several examples of analogous electrical and thermal circuits are shown in FIGS. 10 through 14 to indicate the simplicity of converting an electronic circuit to its heatronic analog and the utility of the resulting devices. Heatronic circuit symbols and practices are also elaborated. Detailed operation of these circuits is not described as it is apparent to one skilled in the electronics arts.

FIG. 10A shows an A.C. electronic amplifier while FIG. 10B shows the heatronic analog. The heat source terminal 126 labeled T+ and the heat sink terminal 127 labeled T− supply the temperature difference to power the amplifier. Alternating or pulsating temperature signals enter the input terminal 128 labeled $T_{in}$, pass through the thermal capacitor 129 and vary the amount of heat transfer vapor in the control reservoir portion 131 of the surplus fluid type heatronic valve. This in turn varies the amount of heat transfer fluid in the heat transfer portion 132 of the heatronic valve, thus varying its conductance and thus the amount of heat passing through the thermal resistance 133 which has a thermal resistance qual to $R_o$. The varying heat flow through $R_o$ produces an equivalent variation in the output temperature $T_{out}$ at the output terminal 134. The gain is approximately the resistance of thermal resistor 133 divided by the thermal resistance of resistor 136 or $R_o/0.1\ R_o= 10$. Thus the output signal in the circuit shown, is approximately 10 times as large as the input signal and can have approximately 100 times the heat flow rate. The other resistors maintain the average temperature of the control reservoir at the proper operating point. heatronic FIG. 11A shows a D.C. amplifier with the input biased with a battery 138 while FIG. 11B shows the equivalent heatronic circuit wherein an interfluid pressure exchange reservoir represented by the symbol 139 of a reservoir split by a movable diaphragm and two fluids *a* and *b*, which have different vapor pressures, is the equivalent of the battery. The symbol 140 represents a control reservoir such as, for example, the reservoir designated 104 in FIG. 6. The bellows 94 and the housing 97 in FIG. 6 are one embodiment of the interfluid pressure exchange reservoir represented by the symbol 139 in FIG. 11B. Note the capillary material 143 symbolized in control reservoir 140 to denote that it retains liquid and releases vapor contrary to control reservoir 13 (FIG. 10B) which retains the vapor.

The load resistor 141 and the resistor 142 controlling the gain operate in the same manner as their equivalents in FIG. 10B to give a gain of about 20. This may be increased considerably by making the resistor 142 equal to zero, in which case the gain depends on the thermal resistances in the conductors and the valve.

FIG. 12A is a schematic of an electronic circuit which maintains the potential $V_x$ relatively constant despite large variations in the current i entering at that point. FIG. 12B is the heatronic analog wherein the temperature of a body 146 is maintained relatively constant despite large variations in the heat flow 147 to it (or generated in it). A relatively large gas reservoir 148 maintains a constant pressure on the heat transfer fluid a in the interfluid pressure exchange reservoir 149 thus keeping the heat transfer portion 151 of the heatronic valve from conducting heat until the body 146 reaches a temperature sufficiently high that the vapor pressure of the heat transfer fluid a is the same as the pressure $P_g$ in the gas reservoir, at which point the heat transfer portion 151 conducts heat, thus maintaining the temperature of the body 146 constant. The temperature T− of the heat sink terminal 152 may fluctuate widely without appreciably affecting the operation of the device, which also reaches its stable operating point rapidly without appreciable overshoot, oscillations, or long term drift.

The embodiments of FIGS. 13A and 13B are substantially equivalent to the embodiments of FIGS. 12A and 12B except that an NPN resistor and a "drying out" type heatronic valve are used, heat sources replace heat sinks and the function of the circuits is to keep potential (temperature) constant when a variable current (heat flux) is leaving the circuit.

The electronic circuit shown in FIG. 14A and its heatronic equivalent in 14B depict differential operational amplifiers. A differential input signal $V_{in}$, which can "float" over a moderate range, is greatly amplified and appears as an output signal $V_{out}$ which also floats over a moderate range. The schematic circuit layout shown in FIG. 14B, and in all the other heatronic circuits, greatly exaggerates the length of the heat conductors and resistors such as heat conductor 156 and resistor 157 which, in practice, if there at all, would be very thin. The heatronic valves, which are thin themselves, fill almost the entire distance between the heat source and the heat sink. The conduits such as 159, which transmit fluid pressure, may be quite long if desired without affecting operation so that they are used along with their control reservoirs such as 161 to perform interconnections whenever feasible. Care must be taken that the conduits from the control reservoirs of the type that emit liquid be maintained at a low enough temperature that the liquid therein doesn't vaporize. Thus, for example, the temperature of the conduit 159 should be slightly below the temperature of the reservoir 161. Likewise conduits from control reservoirs that emit vapor, such as reservoir 140, must be maintained at a temperature above that of the reservoir. Connections between a control reservoir and a heat conductor are indicated by simply having the symbols share a common surface, such as surface 162 between conductor 156 and control reservoir 161.

If a normally liquid carrying conduit must run through regions that are hot enough to vaporize the liquid, or if a vapor carrying conduit must run through regions cold enough to condense the liquid, it is possible to insert one or two interfluid pressure exchange reservoirs such as the reservoir 139 (FIG. 11B) into the conduit and to fill the conduit between two such reservoirs (one is often already present at one end of the conduit) with a liquid having a sufficiently low vapor pressure that it will not vaporize in the conduit or in either of the interfluid pressure exchange reservoirs. This solves the problem but at the expense of having one or two additional pressure exchange reservoirs.

Various types of heatronic valves are feasible that use a second or control fluid to block vapor flow in the heat transfer chamber. Generally this results in additional complications since, if the control fluid is a liquid then both it and the heat transfer fluid, and also the capillary material, must be carefully chosen so that the control fluid does not wet the capillary material in the presence of the heat transfer fluid, thus permanently replacing the heat transfer fluid. If the pressurizing fluid is a gas, as is the case with prior art heat pipe type heat valves, control characteristics are greatly complicated since the pressure in the system is the sum of the partial pressure of the gas plus the partial pressure of the heat transfer fluid vapor in the gas reservoir, which is difficult to control and often depends on the past history of the device. One solution is to maintain the gas reservoir, or part of the conduit to it, sufficiently cold to condense most of the working fluid vapor and thus reduce the working fluid vapor pressure to a negligible value. Assuming that a sufficiently cold heat sink is available to do this, then a capillary wick must be extended between the cold region and the heat transfer chamber to return the condensed working fluid.

Systems of this type can utilize the vented capillary heat transfer surface structures to obtain very high heat flux rates in the same manner as the heatronic valves already described. Such a structure is illustrated in FIG. 15 which has approximately the same structure as shown in FIG. 1 except that prism comprising low thermal conductivity capillary material 136 and high thermal cnductivity capillary material 137 is modified as shown in FIG. 15 to have its base 266 attached to the smallest bars 224 adjacent the metal envelope 221 of the heat output face 220 of the heat transfer chamber portion rather than being attached directly to the metal envelope 221 as shown in FIG. 1. Furthermore, a groove 267 is cut through the capillary material between the hollow passage 234 and the smallest channels (not seen in FIG. 15) adjacent the heat output face 220) so as to allow gas to pass between the hollow passage 234 and various vapor passages in the heat transfer chamber by means of the smallest channels adjacent the heat output face. In many cases the control gas is cooled sufficiently in these channels that additional cooling is not required to condense sufficient heat transfer vapor to allow reasonable control characteristics. This is only true, however, when the heat output face 220 has a temperature sufficiently lower than the heat input face (not shown) that the vapor pressure of the working fluid at these temperatures differs by a factor of about two or more. If the input and output temperatures do not differ sufficiently, additional cooling should be provided in the conduit 233 between the hollow passage 234 and the gas reservoir portion (not shown) or in the gas reservoir portion itself, and a wick (not shown) provided to return the condensed heat transfer fluid to the heat transfer chamber portion. In operation the gas interferes with the heat transfer vapor flow in the same way that excess heat transfer liquid does, so that the valve is roughly similar to a PNP transistor in operation.

The heat transfer portion of a heatronic valve adapted to utilize a second liquid to block or regulate heat transfer vapor flow is constructed similarly to that using gas as shown in FIG. 1 and modified in FIG. 15. In operation a control reservoir of the liquid emitting type or a variable volume reservoir is used to provide the control liquid. Other means, including active ones and external inputs may also be used to provide the control fluid, whether gas or liquid.

A particularly compact heatronic valve results when the control or pressurizing fluid comprises a second control liquid and its vapor in the heatronic valve chamber. The heat transfer portion of the structure again is the same as that shown in FIG. 1 as modified in FIG. 15 while the fluid quantity control portion 32 is a quite small reservoir portion (not shown) lined with capillary material. The capillary material also lines the walls of the conduit 33 between the reservoir portion and the hollow passage 34 so as to form a continuous wick of capillary material from the control reservoir portion (not shown) to the capillary material 37 in the heat transfer portion of the heatronic valve chamber. This wick functions to return any heat transfer fluid that condenses in the conduit or control reservoir portions to the heat transfer portions. In addition to the heat transfer fluid the heatronic valve chamber also contains a small amount of pressurizing or control fluid which is selected so as to not wet the capillary material in the chamber when said capillary material is already wet by the heat transfer fluid. In other words, if said capillary material is in contact with both the heat transfer fluid and the control fluid, the capillary material will preferentially soak up the heat transfer fluid, which will drive any control fluid out of the capillary material. The amount of control fluid necessary is small since it is only required that it form sufficient vapor to replace the heat transfer vapor in the heat transfer portion when the valve is in the OFF state. The control reservoir, which contains the control fluid as a liquid when the valve is ON, can also be very small. Operation of the heat transfer portion is the same as when gas is used as the control fluid, with the control vapor keeping the heat transfer vapor from approaching the heat output face 13 when the valve is OFF. Thus, when the control reservoir portion is heated the control fluid vaporizes and blocks vapor conduction, and thus heat conduction, through the heat transfer portion, while if the control reservoir portion is cooled sufficiently the control fluid condenses in it so that heat transfer proceeds unimpeded. Careful control of the amount of heat transfer fluid in the heatronic valve chamber is necessary to prevent the control reservoir portion from being filled with excess heat transfer fluid, which would replace the control fluid therefrom and make the valve uncontrollable.

Alternatively, it is feasible to use excess capillary material with a lower effective capillary surface to volume ratio δ than the other capillary material as a "sponge reservoir" as described in U.S. Pat. application Ser. No. 52,249 in either the heat transfer portion or the reservoir portion of the heatronic valve to retain excess heat transfer fluid. If the control fluid has a lower vapor pressure than the heat transfer fluid (not usually the case) and the control liquid tends to wet or saturate portions of the capillary material not saturated by the heat transfer liquid then the "sponge" reservoir should be included in the reservoir portion of the chamber containing the control liquid to avoid the temporary capture of control liquid in the heat transfer portion of the chamber and consequent loss of control. Also, as long as the control liquid wets the capillary material unsaturated with heat transfer liquid, the "sponge reservoir," if large enough, also acts as a reservoir for the control liquid, helping to retain it in the control reservoir portion. It is also feasible to utilize a second capillary material that is preferentially wet by the control liquid in the reservoir portion to help contain the control liquid in the reservoir. In operation the reservoir portion of this embodiment of the hatronic valve should always remain cooler than the rest of the valve, not be heated too rapidly, and be placed so that there is always a continuous drift of heat transfer vapor towards it, as was done in the embodiment illustrated. The temperature limitation assures that the control vapor will not be condensed in the heat transfer portion but limits the maximum allowable temperature difference between the heat input and heat output faces of the valve if it is to be capable of turning off. This temperature difference may be fairly large if high vapor pressure control fluids are used though since it is equal to the difference between the temperature at which the heat transfer fluid has a given vapor pressure and the temperature at which the sum of the heat transfer fluid vapor pressure and the control fluid vapor pressure equals the given pressure. The limitation on the rate of increase of reservoir temperature is to prevent the control liquid from boiling and spattering out and usually is not an appreciable limitation under normal operating conditions. The drift of vapor towards the reservoir portion serves as a transport mechanism wherein excess control vapor is swept back towards the reservoir, while the capillary material in the reservoir, conduit and heat transport portion returns condensed working fluid so as to keep up the vapor circulation. The vapor circulation towards the reservoir need not be large, and, in fact, does not go clear to the reservoir if the valve is even very partially "closed," so that heat transport to the reservoir is negligible except when the control reservoir portion is "overdriven" below the temperature necessary for the valve to be full ON.

Despite the limitations of this embodiment relative to the other embodiments of the heatronic valve described herein it remains the smallest of all embodiments due to the small size of the control reservoir portion and thus is of use in systems where weight or size are critical.

Although limited embodiments of variable conductance heat transfer devices or heatronic valves have been described and illustrated herein, many modifications and variations will be apparent to one skilled in the art. It is therefore to be understood that within the scope of the appended claims the invention may be practiced otherwise than as specifically described.

What is claimed is:

1. A variable conductance heat transfer device comprising:

a chamber;

a first phase change region adjacent a boundary of the chamber through which heat enters the chamber;

a second phase change region adjacent a boundary of the chamber through which heat exits the chamber;

a heat transfer fluid, comprising a liquid and its vapor, in the chamber; said fluid transferring heat from the first phase change region to the second phase change region by means of a heat transfer cycle wherein the liquid is vaporized in the first phase change region and the resulting vapor is condensed in the second phase change region from which the resulting liquid returns to the first phase change region;

means for regulating the flow of heat transfer fluid through the heat transfer cycle; and capillary material in the chamber for conveying the heat transfer liquid by capillary forces at least a portion of the way from the second phase change region to the first phase change region; and wherein one of the phase change regions further comprises:

a multiplicity of regional areas of phase change comprising surface portions of the capillary material, and wherein the heat of phase change is conducted through the capillary material between the regional areas of phase change and a chamber boundary; and a multiplicity of vapor passages in direct vapor communication with said regional areas of phase change and in vapor communication with the other phase change region; and wherein said regional areas of phase change are spaced apart by less than 0.1 inch.

2. A variable conductance heat transfer device comprising:

a chamber;

a first phase change region adjacent a boundary of the chamber through which heat enters the chamber;

a second phase change region adjacent a boundary of the chamber through which heat exits the chamber;

a heat transfer fluid, comprising a liquid and its vapor, in the chamber; said fluid transferring heat from the first phase change region to the second phase change region by means of a heat transfer cycle wherein the liquid is vaporized in the first phase change region and the resulting vapor is condensed in the second phase change region from which the resulting liquid returns to the first phase change region;

means for regulating the flow of heat transfer fluid through the heat transfer cycle; and capillary material in the chamber for conveying the heat transfer liquid by capillary forces at least a portion of the way from the second phase change region to the first phase change region; and wherein one of the phase change regions further comprises:

a multiplicity of regional areas of phase change comprising surface portions of the capillary material, and wherein the heat of phase change is conducted through the capillary material between the regional areas of phase change and a chamber boundary; and a first multiplicity of vapor passages in direct vapor communication with said regional areas of phase change and in vapor communication with the other change region; and a second multiplicity of passages spaced relatively less closely together than the first multiplicity of passages and in vapor communication between the first multiplicity of passages and the other phase change region.

3. A variable conductance heat transfer device comprising:

a chamber;

a first phase change region adjacent a boundary of the chamber through which heat enters the chamber;

a second phase change region adjacent a boundary of the chamber through which heat exits the chamber;

a heat transfer fluid, comprising a liquid and its vapor, in the chamber; said fluid transferring heat from the first phase change region to the second phase change region by means of a heat transfer cycle wherein the liquid is vaporized in the first phase change region and the resulting vapor is condensed in the second phase change region from which the resulting liquid returns to the first phase change region;

means for regulating the flow of heat transfer fluid through the heat transfer cycle; and capillary material in the chamber for conveying the heat transfer liquid by capillary forces at least a portion of the way from the second phase change region to the first phase change region; and wherein one of the phase change regions further comprises:

a multiplicity of regional areas of phase change comprising surface portions of the capillary material, and wherein the heat of phase change is conducted through the capillary material between the regional areas of phase change and a chamber boundary; and a multiplicity of vapor passages in direct vapor communication with said regional areas of phase change and in vapor communication with the other phase change region; and wherein said body of capillary material further comprises:

a first volumetric portion relatively nearer the regional areas of phase change and having a relatively higher thermal conductivity; and a second volumetric portion relatively further from the regional areas of phase change and having a relatively lower thermal conductivity.

4. A variable conductance heat transfer device comprising:

a chamber;

a first phase change region adjacent a boundary of the chamber through which heat enters the chamber;

a second phase change region adjacent a boundary of the chamber through which heat exits the chamber;

a heat transfer fluid, comprising a liquid and its vapor, in the chamber; said fluid transferring heat from the first phase change region to the second phase change region by means of a heat transfer cycle wherein the liquid is vaporized in the first phase change region and the resulting vapor is condensed in the second phase change region from which the resulting liquid returns to the first phase change region;

means for regulating the flow of heat transfer fluid through the heat transfer cycle; and capillary material in the chamber for conveying the heat transfer liquid by capillary forces at least a portion of the way from the second phase change region to the first phase change region; and wherein one of the phase change regions further comprises:

a multiplicity of regional areas of phase change comprising surface portions of the capillary material, and wherein the heat of phase change is conducted through the capillary material between the regional areas of phase change and a chamber boundary; and a multiplicity of vapor passages in direct vapor communication with said regional areas of phase change and in vapor communication with the other phase change region; and wherein said body of capillary material further comprises:

a first volumetric portion relatively nearer the regional areas of phase change and having a relatively larger capillary surface per volume ratio $\delta$; and a second volumetric portion relatively further from the regional areas of phase change and having a relatively smaller capillary surface per volume ratio $\delta$.

5. A variable conductance heat transfer device comprising:

a chamber;

a first phase change region adjacent a boundary of the chamber through which heat enters the chamber;

a second phase change region adjacent a boundary of the chamber through which heat exits the chamber;

a heat transfer fluid, comprising a liquid and its vapor, in the chamber; said fluid transferring heat from the first phase change region to the second phase change region by means of a heat transfer cycle wherein the liquid is vaporized in the first phase change region and the resulting vapor is condensed in the second phase change region from which the resulting liquid returns to the first phase change region;

means for regulating the flow of heat transfer fluid through the heat transfer cycle;

capillary material in the chamber for conveying the heat transfer liquid by capillary forces at least a portion of the way from the second phase change region to the first phase change region; and wherein at least one phase change region further comprises:

a multiplicity of regional areas of phase change comprising surface portions of the capillary material and wherein the heat of phase change is conducted through the capillary material between the regional areas of phase change and a chamber boundary; and a multiplicity of vapor passages in direct vapor communication with said regional areas of phase change and in vapor communication with the phase change region wherein the phase change opposite to that occurring in said regional areas of phase change takes place; and wherein the first and second phase change regions are arrayed substantially on planes parallel to each other.

6. A variable conductance heat transfer device comprising:

a chamber;

a first phase change region adjacent a boundary of the chamber through which heat enters the chamber;

a second phase change region adjacent a boundary of the chamber through which heat exits the chamber;

a heat transfer fluid, comprising a liquid and its vapor, in the chamber; said fluid transferring heat from the first phase change region to the second phase change region by means of a heat transfer cycle wherein the liquid is vaporized in the first phase change region and the resulting vapor is condensed in the second phase change region from which the resulting liquid returns to the first phase change region;

means for regulating the flow of heat transfer fluid through the heat transfer cycle;

capillary material in the chamber for conveying the heat transfer liquid by capillary forces at least a portion of the way from the second phase change region to the first phase change region; and wherein at least one phase change region further comprises:

a multiplicity of regional areas of condensation comprising surface portions of the capillary material; and wherein the heat of condensation is conducted through the capillary material from the regional areas of condensation to the chamber boundary through which heat exits; and a multiplicity of vapor passages in direct vapor communication with said regional areas of condensation and in vapor communication with the phase change region wherein vaporization takes place; and wherein said means for regulating the flow of heat transfer fluid through the heat transfer cycle comprises means for restricting the access of the heat transfer vapor to the second phase change region comprising additional heat transfer fluid in excess of the amount necessary for full heat conduction and means for regulating the quantity of the additional heat transfer fluid in the heat transfer portion of the chamber.

7. A variable conductance heat transfer device comprising:

a chamber;

a first phase change region adjacent a boundary of the chamber through which heat enters the chamber;

a second phase change region adjacent a boundary of the chamber through which heat exits the chamber;

a heat transfer fluid, comprising a liquid and its vapor, in the chamber; said fluid transferring heat from the first phase change region to the second phase change region by means of a heat transfer cycle wherein the liquid is vaporized in the first phase change region and the resulting vapor is condensed in the second phase change region from which the resulting liquid returns to the first phase change region;

means for regulating the flow of heat transfer fluid through the heat transfer cycle;

capillary material in the chamber for conveying the heat transfer liquid by capillary forces substantially the entire distance from the second phase change region to the first phase change region; and wherein at least one phase change region further comprises:

a multiplicity of regional areas of phase change comprising surface portions of the capillary material, and wherein the heat of phase change is conducted through the capillary material between the regional areas of phase change and a chamber boundary; and a multiplicity of vapor passages in direct vapor communication with said regional areas of phase change and in vapor communication with the phase change region wherein the phase change opposite to that occurring in said regional areas of phase change takes place; and wherein said means for regulating the flow of heat transfer fluid through the heat transfer cycle comprises means for restricting the access of the heat transfer vapor to the second phase change region comprising additional heat transfer fluid in excess of the amount necessary for full heat conduction and means for regulating the quantity of the additional heat transfer fluid in the heat transfer portion of the chamber.

8. A variable conductance heat transfer device comprising:

a chamber;

a first phase change region adjacent a boundary of the chamber through which heat enters the chamber;

a second phase change region adjacent a boundary of the chamber through which heat exits the chamber;

a heat transfer fluid, comprising a liquid and its vapor, in the chamber; said fluid transferring heat from the first phase change region to the second phase change region by means of a heat transfer cycle wherein the liquid is vaporized in the first phase change region and the resulting vapor is condensed in the second phase change region from which the resulting liquid returns to the first phase change region;

means for regulating the flow of heat transfer fluid through the heat transfer cycle;

capillary material in the chamber for conveying the heat transfer liquid by capillary forces at least a portion of the way from the second phase change region to the first phase change region; and wherein at least one phase change region further comprises:

a multiplicity of regional areas of phase change comprising surface portions of the capillary material and wherein the heat of phase change is conducted through the capillary material between the regional areas of phase change and a chamber boundary; and a multiplicity of vapor passages in direct vapor communication with said regional areas of phase change and in vapor communication with the phase change region wherein the phase change opposite to that occurring in said regional areas of phase change takes place; and wherein a multiplicity of said vapor passages are embedded substantially into the capillary material; and wherein said means for regulating the flow of heat transfer fluid through the heat transfer cycle comprises means for restricting the access of the heat transfer vapor to the second phase change region comprising additional heat transfer fluid in excess of the amount necessary for full heat conduction and means for regulating the quantity of the additional heat transfer fluid in the heat transfer portion of the chamber.

9. A variable conductance heat transfer device comprising:

a chamber;

a first phase change region adjacent a boundary of the chamber through which heat enters the chamber;

a second phase change region adjacent a boundary of the chamber through which heat exits the chamber;

a heat transfer fluid, comprising a liquid and its vapor, in the chamber; said fluid transferring heat from the first phase change region to the second phase change region by means of a heat transfer cycle wherein the liquid is vaporized in the first phase change region and the resulting vapor is condensed in the second phase change region from which the resulting liquid returns to the first phase change region;

means for regulating the flow of heat transfer fluid through the heat transfer cycle;

capillary material in the chamber for conveying the heat transfer liquid by capillary forces at least a portion of the way from the second phase change region to the first phase change region; and wherein at least one phase change region further comprises:

a multiplicity of regional areas of phase change comprising surface portions of the capillary material, and wherein the heat of phase change is conducted through the capillary material between the regional areas of phase change and a chamber boundary; and a multiplicity of vapor passages in direct vapor communication with said regional areas of phase change and in vapor communication through capillary material with the phase change region wherein the phase change opposite to that occurring in said regional areas of phase change takes place; and wherein said means for regulating the flow of heat transfer fluid through the heat transfer cycle comprises means for restricting the access of the heat transfer vapor to the second phase change region comprising additional heat transfer fluid in excess of the amount necessary for full heat conduction and means for regulating the quantity of the additional heat transfer fluid in the heat transfer portion of the chamber.

10. A variable conductance heat transfer device comprising:

a chamber;

a first phase change region adjacent a boundary of the chamber through which heat enters the chamber;

a second phase change region adjacent a boundary of the chamber through which heat exits the chamber;

a heat transfer fluid, comprising a liquid and its vapor, in the chamber; said fluid transferring heat from the first phase change region to the second phase change region by means of a heat transfer cycle wherein the liquid is vaporized in the first phase change region and the resulting vapor is condensed in the second phase change region from which the resulting liquid returns to the first phase change region;

means for regulating the flow of heat transfer fluid through the heat transfer cycle;

capillary material in the chamber for conveying the heat transfer liquid by capillary forces at least a portion of the way from the second phase change region to the first phase change region; and wherein at least one phase change region further comprises:

a multiplicity of regional areas of phase change comprising surface portions of the capillary material, and wherein the heat of phase change is conducted through the capillary material between the regional areas of phase change and a chamber boundary; and a multiplicity of vapor passages in direct vapor communication with said regional areas of phase change and in vapor communication with the phase change region wherein the phase change opposite to that occurring in said regional areas of phase change takes place; and wherein said means for regulating the flow of heat transfer fluid through the heat transfer cycle comprises means for restricting the access of the heat transfer vapor to the second phase change region comprising additional heat transfer fluid in excess of the amount necessary for full heat conduction and means for regulating the quantity of the additional heat transfer fluid in the heat transfer portion of the chamber comprising:

a reservoir portion of the chamber; and means for varying pressure in the reservoir portion of the chamber.

11. A variable conductance heat transfer device as defined in claim 10 wherein the means for varying pressure in the reservoir portion of the chamber comprises means to vary the volume of the reservoir portion of the chamber.

12. A variable conductance heat transfer device comprising:

a chamber;

a first phase change region adjacent a boundary of the chamber through which heat enters the chamber;

a second phase region adjacent a boundary of the chamber through which heat exits the chamber;

a heat transfer fluid, comprising a liquid and its vapor, in the chamber; said fluid transferring heat from the first phase change region to the second phase change region by means of a heat transfer cycle wherein the liquid is varporized in the first phase change region and the resulting vapor is condensed in the second phase change region from which the resulting liquid returns to the first phase change region;

means for regulating the flow of heat transfer fluid through the heat transfer cycle; and capillary material in the chamber for conveying the heat transfer liquid by capillary forces at least a portion of the way from the second phase change region to the first phase change region; and wherein at least one phase change region further comprises:

a multiplicity of regional areas of phase change comprising surface portions of the capillary material, and wherein the heat of phase change is conducted through the capillary material between the regional areas of phase change and a chamber boundary; and a multiplicity of vapor passages in direct vapor communication with said regional areas of phase change and in vapor communication with the phase change region wherein the phase change opposite to that occurring in said regional areas of phase change takes place; and wherein said means for regulating the flow of heat transfer fluid through the heat transfer cycle comprises means to regulate the quantity of heat transfer fluid in the heat transfer portion of the chamber comprising: a fluid reservoir portion of the chamber; and wherein the quantity of heat transfer fluid in the heat transfer portion of the chamber is regulated by regulating the quantity of heat transfer fluid in the reservoir portion of the chamber that is in the vapor state so as to displace a variable amount of heat transfer liquid from the reservoir portion to the heat transfer portion.

13. A variable conductance heat transfer device comprising:

a chamber;

a first phase change region adjacent a boundary of the chamber through which heat enters the chamber;

a second phase change region adjacent a boundary of the chamber through which heat exits the chamber;

a heat transfer fluid, comprising a liquid and its vapor, in the chamber; said fluid transferring heat from the first phase change region to the second phase change region by means of a heat transfer cycle wherein the liquid is vaporized in the first phase change region and the resulting vapor is condensed in the second phase change region from which the resulting liquid returns to the first phase change region;

means for regulating the flow of heat transfer fluid through the heat transfer cycle;

capillary material in the chamber for conveying the heat transfer liquid by capillary forces substantially the entire distance from the second phase change region to the first phase change region; and wherein at least one phase change region further comprises:

a multiplicity of regional areas of phase change comprising surface portions of the capillary material, and wherein the heat of phase change is conducted through the capillary material between the regional areas of phase change and a chamber boundary; and a multiplicity of vapor passages in direct vapor communication with said regional areas of phase change and in vapor communication with the phase change region wherein the phase change opposite to that occurring in said regional areas of phase change takes place; and wherein said means for regulating the flow of heat transfer fluid through the heat transfer cycle comprises:

a reservoir portion of the chamber;

means for regulating pressure in the reservoir portion of the chamber; and means for conducting the liquid from the reservoir portion of the chamber into contact with the body of capillary material in the heat transfer portion of the chamber without substantial vaporization of the liquid being so conducted.

14. A variable conductance heat transfer device as defined in claim 13 wherein the means for conducting the liquid from the reservoir portion of the chamber into contact with the capillary material in the heat transfer portion of the chamber without substantial vaporization of the liquid being so conducted comprises a passage from the reservoir portion of the chamber to a region in the heat transfer portion of the chamber adjacent a portion of the capillary material which is in thermal contact with a boundary of the chamber through which heat exits the chamber.

15. A variable conductance heat transfer device as defined in claim 13 wherein the means for conducting the liquid from the reservoir portion of the chamber into contact with the capillary material in the heat transfer portion of the chamber without substantial vaporization of the liquid being so conducted comprises a passage from the reservoir portion of the chamber to a region in the heat transfer portion of the chamber surrounded by a portion of the capillary material which is in thermal contact with a boundary of the chamber through which heat exits the chamber.

16. A variable conductance heat transfer device comprising:

a chamber;

a first phase change region adjacent a boundary of the chamber through which heat enters the chamber;

a second phase change region adjacent a boundary of the chamber through which heat exits the chamber;

a heat transfer fluid, comprising a liquid and its vapor, in the chamber; said fluid transferring heat from the first phase change region to the second phase change region by means of a heat transfer cycle wherein the liquid is vaporized in the first phase change region and the resulting vapor is condensed in the second phase change region from which the resulting liquid returns to the first phase change region;

means for regulating the flow of heat transfer fluid through the heat transfer cycle;

capillary material in the chamber for conveying the heat transfer liquid by capillary forces substantially the entire distance from the second phase change region to the first phase change region; and wherein at least one phase change region further comprises:

a multiplicity of regional areas of phase change comprising surface portions of the capillary material, and wherein the heat of phase change is conducted through the capillary material between the regional areas of phase change and a chamber boundary; and a multiplicity of vapor passages in direct vapor communication with said regional areas of phase change and in vapor communication with the phase change region wherein the phase change opposite to that occurring in said regional areas of phase change takes place; and wherein said means for regulating the flow of heat transfer fluid through the heat transfer cycle comprises means for reducing the quantity of heat transfer fluid in the heat transfer portion of the chamber below that necessary for full heat conduction comprising means for withdrawing heat transfer liquid held in the capillary spaces of the capillary material by capillary forces from the capillary material without vaporizing said liquid in the course of withdrawal.

17. A variable conductance heat transfer device as defined in claim 16 wherein the means for withdrawing heat transfer liquid held in the capillary spaces of the capillary material without vaporizing said liquid in the course of withdrawal comprises:

a reservoir portion of the chamber; and means for lowering the pressure in the reservoir portion of the chamber sufficiently lower than the pressure in the heat transfer portion that the pressure difference between them is sufficient to drive liquid from the capillary spaces in the capillary material into the reservoir portion of the chamber.

18. A variable conductance heat transfer device as defined in claim 17 wherein the means for lowering the pressure in the reservoir portion of the chamber includes means for preventing vapor from flowing between the heat transfer and reservoir portions of the chamber while allowing heat transfer liquid to flow therebetween.

19. A variable conductance heat transfer device comprising:

a chamber;

a first phase change region adjacent a boundary of the chamber through which heat enters the chamber;

a second phase change region adjacent a boundary of the chamber through which heat exits the chamber;

a heat transfer fluid, comprising a liquid and its vapor, in the chamber; said fluid transferring heat from the first phase change region to the second phase change region by means of a heat transfer cycle wherein the liquid is vaporized in the first phase change region and the resulting vapor is condensed in the second phase change region from which the resulting liquid returns to the first phase change region;

means for regulating the flow of heat transfer fluid through the heat transfer cycle;

capillary material in the chamber for conveying the heat transfer liquid by capillary forces substantially the entire distance from the second phase change region to the first phase change region; and wherein at least one phase change region further comprises:

a multiplicity of regional areas of phase change comprising surface portions of the capillary material, and wherein the heat of phase change is conducted through the capillary material between the regional areas of phase change and the chamber boundary; and a multiplicity of vapor passages in direct vapor communication with said regional areas of phase change and in vapor communication with the phase change region wherein the phase change opposite to that occurring in said regional areas of phase change takes place; and wherein said means for regulating the flow of heat transfer fluid through the heat transfer cycle comprises:

a reservoir portion of the chamber;

means for regulating the pressure in the reservoir portion of the chamber; and means for preventing vapor from flowing between the heat transfer portion of the chamber and the reservoir portion of the chamber while allowing the heat transfer liquid to flow therebetween.

20. A variable conductance heat transfer device as defined in claim 19 wherein the means for preventing vapor from flowing between the heat transfer portion of the chamber and the reservoir portion of the chamber while allowing the heat transfer liquid to flow therebetween comprises a barrier of capillary material wetted by the heat transfer liquid and placed to form a barrier to vapor flow between the reservoir and heat transfer portions of the chamber while allowing the heat transfer liquid to flow therebetween through the capillary spaces of the barrier.

21. A variable conductance heat transfer device comprising:

a chamber;

a first phase change region adjacent a boundary of the chamber through which heat enters the chamber;

a second phase change region adjacent a boundary of the chamber through which heat exits the chamber;

a heat transfer fluid, comprising a liquid and its vapor, in the chamber; said fluid transferring heat from the first phase change region to the second phase change region by means of a heat transfer cycle wherein the liquid is vaporized in the first phase change region and the resulting vapor is condensed in the second phase change region from which the resulting liquid returns to the first phase change region;

means for regulating the flow of heat transfer fluid through the heat transfer cycle;

capillary material in the chamber for conveying the heat transfer liquid by capillary forces at least a portion of the way from the second phase change region to the first phase change region; and wherein at least one phase change region further comprises:

a multiplicity of regional areas of phase change comprising surface portions of the capillary material, and wherein the heat of phase change is conducted through the capillary material between the regional areas of phase change and a chamber boundary; and a multiplicity of vapor passages in direct vapor communication with said regional areas of phase change and in vapor communication with the phase change region wherein the phase change opposite to that occurring in said regional areas of phase change takes place; and wherein said means for regulating the flow of heat transfer fluid through the heat transfer cycle comprises:

a reservoir portion of the chamber;

a second fluid, liquid of the second fluid being in the reservoir portion of the chamber;

means for regulating the pressure in the reservoir portion of the chamber; and means for preventing vapor from flowing from the reservoir portion towards the heat transfer portion while allowing the liquid of the second fluid to so flow from the reservoir.

22. A variable conductance heat transfer device comprising:

a chamber;

a first phase change region adjacent a boundary of the chamber through which heat enters the chamber;

a second phase change region adjacent a boundary of the chamber through which heat exits the chamber;

a heat transfer fluid, comprising a liquid and its vapor, in the chamber; said fluid transferring heat from the first phase change region to the second phase change region by means of a heat transfer cycle wherein the liquid is vaporized in the first phase change region and the resulting vapor is condensed in the second phase change region from which the resulting liquid returns to the first phase change region;

means for regulating the flow of heat transfer fluid through the heat transfer cycle;

capillary material in the chamber for conveying the heat transfer liquid by capillary forces at least a portion of the way from the second phase change region to the first phase change region; and wherein at least one phase change region further comprises:

a multiplicity of regional areas of phase change comprising surface portions of the capillary material, and wherein the heat of phase change is conducted through the capillary material between the regional areas of phase change and a chamber boundary; and a multiplicity of vapor passages in direct vapor communication with said regional areas of phase change and in vapor communication with the phase change region wherein the phase change opposite to that occurring in said regional areas of phase change takes place; and wherein said means for regulating the flow of heat transfer fluid through the heat transfer cycle comprises means to control the quantity of the heat transfer fluid in the heat transfer portion of the chamber comprising:

a fluid reservoir portion of the chamber having a variable volume; and means for controlling the volume of said fluid reservoir portion.

23. A variable conductance heat transfer device as defined in claim 22 wherein said one phase change region comprises the vaporization phase change region.

24. A variable conductance heat transfer device as defined in claim 22 wherein said one phase change region comprises the condensation phase change region.

25. A variable conductance heat transfer device comprising:

a chamber;

a first phase change region adjacent a boundary of the chamber through which heat enters the chamber;

a second phase change region adjacent a boundary of the chamber through which heat exits the chamber;

a heat transfer fluid, comprising a liquid and its vapor, in the chamber; said fluid transferring heat from the first phase change region to the second phase change region by means of a heat transfer cycle wherein the liquid is vaporized in the first phase change region and the resulting vapor is condensed in the second phase change region from which the resulting liquid returns to the first phase change region;

means for regulating the flow of heat transfer fluid through the heat transfer cycle;

capillary material in the chamber for conveying the heat transfer liquid by capillary forces at least a portion of the way from the second phase change region to the first phase change region; and wherein at least one phase change region further comprises:

a multiplicity of regional areas of phase change comprising surface portions of the capillary material, and wherein the heat of phase change is conducted through the capillary material between the regional areas of phase change and a chamber boundary; and a multiplicity of vapor passages in direct vapor communication with said regional areas of phase change and in vapor communication with the phase change region wherein the phase change opposite to that occurring in said regional areas of phase change takes place; and wherein said means for regulating the flow of heat transfer fluid through the heat transfer cycle comprises:

a second fluid; and means for varying the volume of the second fluid in the heat transfer portion of the chamber.

26. A variable conductance heat transfer device as defined in claim 25 wherein the second fluid comprises a gas which does not condense during normal operation.

27. A variable conductance heat transfer device as defined in claim 26 further comprising a reservoir portion of the chamber and wherein the gas is contained within the chamber boundaries.

28. A variable conductance heat transfer device as defined in claim 25 further comprising a reservoir portion of the chamber and wherein the second fluid is retained in part as a liquid in the reservoir portion of the chamber.

29. A variable conductance heat transfer device as defined in claim 28 wherein the means for varying the volume of the second fluid in the heat transfer portion of the chamber comprises means for vaporizing liquid of the second fluid in the reservoir portion of the chamber.

30. A variable heat transfer device as defined in claim 28 wherein the means for varying the volume of the second fluid in the heat transfer portion of the chamber comprises:

means for displacing the second liquid from the reservoir portion of the chamber; and means for vaporizing the displaced second liquid after it leaves the reservoir portion.

31. A variable heat transfer device as defined in claim 28 wherein the means for varying the volume of the second fluid in the heat transfer portion of the chamber comprises means for varying the volume of the reservoir portion of the chamber.

32. A variable heat transfer device as defined in claim 28 wherein the means for varying the volume of the second fluid in the heat transfer portion of the chamber comprises means for displacing the second liquid from the reservoir portion of the chamber into the heat transfer portion of the chamber by varying the vapor pressure within the reservoir portion of the chamber.

33. A variable conductance heat transfer device comprising:

a chamber;

a first phase change region adjacent a boundary of the chamber through which heat enters the chamber;

a second phase change region adjacent a boundary of the chamber through which heat exits the chamber;

a heat transfer fluid, comprising a liquid and its vapor, in the chamber; said fluid transferring heat from the first phase change region to the second phase change region by means of a heat transfer cycle wherein the liquid is vaporized in the first phase change region and the resulting vapor is condensed in the second phase change region from which the resulting liquid returns to the first phase change region;

means for regulating the flow of heat transfer fluid through the heat transfer cycle;

capillary material in the chamber for conveying the heat transfer liquid by capillary forces at least a portion of the way from the second phase change region to the first phase change region; and wherein at least one phase change region further comprises:

a multiplicity of regional areas of phase change comprising surface portions of the capillary material, and wherein the heat of phase change is conducted through the capillary material between the regional areas of phase change and a chamber boundary; and a multiplicity of vapor passages in direct vapor communication with said regional areas of phase change and in vapor communication with the phase change region wherein the phase change opposite to that occurring in said regional areas of phase change takes place; and wherein said means for regulating the flow of heat transfer fluid through the heat transfer cycle comprises means for varying the quantity of heat transfer fluid in the heat transfer portion of the chamber comprising:

a reservoir portion of the chamber containing some heat transfer liquid;

a second fluid;

means for varying the pressure of the second fluid; and means for the pressure of the second fluid to influence the distribution of the heat transfer fluid between the reservoir portion and the heat transfer portion of the chamber by effecting transfer of heat transfer liquid between the reservoir portion of the chamber and the heat transfer portion of the chamber.

34. A variable conductance heat transfer device as defined in claim 33 wherein at aleast a portion of the second fluid is contained in the reservoir portion of the chamber and wherein the means for the pressure of the second fluid to influence the distribution of the heat transfer fluid comprises direct pressurization of the reservoir portion and the heat transfer fluid therein by the second liquid in the reservoir portion.

35. A variable conductance heat transfer device as defined in claim 34 wherein a portion of the second fluid contained in the reservoir portion of the chamber is in the liquid state and wherein the means for varying pressure comprises means for varying the vapor pressure of the second fluid including means for varying the temperature of at least a portion of the second fluid in the liquid state within the reservoir portion of the chamber.

36. A variable conductance heat transfer device as defined in claim 33 wherein the second fluid is isolated from direct contact with the heat transfer fluid and wherein the means for the varying pressure of the second fluid to influence the distribution of the heat transfer fluid comprises means for varying the volume of the reservoir portion of the chamber in response to pressure of the second fluid.

37. A variable conductance heat transfer device as defined in claim 33 wherein the means for varying the pressure of the second fluid comprises means for varying the temperature of at least a portion of the second fluid in the liquid state, whereby the vapor pressure of the second fluid is varied.

38. A variable conductance heat transfer device comprising:

a chamber;

a first phase change region adjacent a boundary of the chamber through which heat enters the chamber;

a second phase change region adjacent a boundary of the chamber through which heat exits the chamber;

a heat transfer fluid, comprising a liquid and its vapor, in the chamber; said fluid transferring heat from the first phase change region to the second phase change region by means of a heat transfer cycle wherein the liquid is vaporized in the first phase change region and the resulting vapor is condensed in the second phase change region from which the resulting liquid returns to the first phase change region;

means for regulating the flow of heat transfer fluid through the heat transfer cycle;

capillary material in the chamber for conveying the heat transfer liquid by capillary forces at least substantially the entire distance from the second phase change region to the first phase change region; and wherein at least one phase change region further comprises:

a multiplicity of regional areas of phase change comprising surface portions of the capillary material, and wherein the heat of phase change is conducted through the capillary material between the regional areas of phase change and a chamber boundary; and a multiplicity of vapor passages in direct vapor communication with said regional areas of phase change and in vapor communication with the phase change region wherein the phase change opposite to that occurring in said regional areas of phase change takes place; and wherein said means for regulating the flow of heat transfer fluid through the heat transfer cycle comprises means for varying the quantity of heat transfer fluid in the heat transfer portion of the chamber comprising:

a reservoir portion of the chamber containing some heat transfer liquid;

a second fluid; and means for regulating the pressure of the second fluid; and means for the pressure of the second fluid to influence the distribution of the heat transfer fluid between the reservoir portion and the heat transfer portion of the chamber by effecting transfer of heat transfer liquid between the reservoir portion of the chamber and the heat transfer portion of the chamber.

39. A variable conductance heat transfer device as defined in claim 38 wherein the second fluid comprises a gas and wherein the means for regulating the pressure of the second fluid comprises a gas reservoir means for maintaining the pressure of the gas.

40. A variable conductance heat transfer device as defined in claim 39 wherein the gas reservoir is in fluid communication with the reservoir portion of the chamber and wherein the means for the second fluid to influence the distribution of heat transfer fluid in the reservoir portion of the chamber comprises direct pressurization of the reservoir portion and the heat transfer liquid therein by the gas.

41. A variable conductance heat transfer device comprising:

a chamber;

a first phase change region adjacent a boundary of the chamber through which heat enters the chamber;

a second phase change region adjacent a boundary of the chamber through which heat exits the chamber;

a heat transfer fluid, comprising a liquid and its vapor, in the chamber; said fluid transferring heat from the first phase change region to the second phase change region by means of a heat transfer cycle wherein the liquid is vaporized in the first phase change region and the resulting vapor is condensed in the second change region from which the resulting liquid returns to the first phase change region;

means for regulating the flow of heat transfer fluid through the heat transfer cycle;

capillary material in the chamber for conveying the heat transfer liquid by capillary forces substantially the entire distance from the second phase change region to the first phase change region; and wherein at least one phase change region further comprises:

a multiplicity of regional areas of phase change comprising surface portions of the capillary material, and wherein the heat of phase change is conducted through the capillary material between the regional areas of phase change and a chamber boundary; and a multiplicity of vapor passages in direct vapor communication with said regional areas of phase change and in vapor communication with the phase change region wherein the phase change opposite to that occurring in said regional areas of phase change takes place; and wherein the regional areas of phase change are spaced sufficiently closely to each other that the centers of the regional areas of phase change are closer to the centers of their nearest neighbors than to the nearest substantial portion of the phase change region whereat the opposite phase change takes place.

42. A variable conductance heat transfer device comprising:

a chamber;

a first phase change region adjacent a boundary of the chamber through which heat enters the chamber;

a second phase change region adjacent a boundary of the chamber through which heat exits the chamber;

a heat transfer fluid, comprising a liquid and its vapor, in the chamber; said fluid transferring heat from the first phase change region to the second phase change region by means of a heat transfer cycle wherein the liquid is vaporized in the first phase change region and the resulting vapor is condensed in the second phase change region from which the resulting liquid returns to the first phase change region;

means for regulating the flow of heat transfer fluid through the heat transfer cycle;

capillary material in the chamber for conveying the heat transfer liquid by capillary forces at least a portion of the way from the second phase change region to the first phase change region; and wherein the second phase change region further comprises:

a multiplicity of regional areas of condensation comprising surface portions of the capillary material, and wherein the heat of condensation is conducted through the capillary matrix from the regional areas of condensation to the chamber boundary through which heat exits; and a multiplicity of vapor passages in direct vapor communication with said regional areas of condensation and in vapor communication with the first phase change region; and wherein the regional areas of condensation are spaced sufficiently closely to each other that the centers of the regional areas of phase change are closer to the centers of their nearest neighbors than to the nearest substantial portion of the first phase change region.

* * * * *

7375:RDS

PO-1050
(5/69)

UNITED STATES PATENT OFFICE
CERTIFICATE OF CORRECTION

Patent No. 3,818,980 Dated June 25, 1974

Inventor(s) Robert David Moore, Jr.

It is certified that error appears in the above-identified patent and that said Letters Patent are hereby corrected as shown below:

In the inventor's address "Rd." should read -- Real --. Column 6, line 1, "seond" should read -- second --. Column 8, line 67, "liquid" should read -- fluid --. Column 9, line 46, "small" should read -- same --. Column 14, line 63, "fluid" should read -- fluids --. Column 19, line 14, "a" should read -- or --. Column 21, line 7, "utilizaing" should read -- utilizing --. Column 23, line 61 "qual" should read -- equal --. Column 24, line 3, delete "heatronic". Column 25, line 68, delete ")". Column 27, line 33, "hatronic" should read -- heatronic --.

Signed and sealed this 31st day of December 1974.

(SEAL)
Attest:

McCOY M. GIBSON JR.
Attesting Officer

C. MARSHALL DANN
Commissioner of Patents

UNITED STATES PATENT OFFICE

CERTIFICATE OF CORRECTION

Patent No. 3,818,980 Dated June 25, 1974

Inventor(s) Robert David Moore, Jr.

It is certified that error appears in the above-identified patent and that said Letters Patent are hereby corrected as shown below:

The term of this patent subsequent to August 10, 1988, has been disclaimed.

Signed and Sealed this

Thirteenth Day of July 1976

[SEAL]

*Attest:*

RUTH C. MASON
*Attesting Officer*

C. MARSHALL DANN
*Commissioner of Patents and Trademarks*